United States Patent [19]
Momochi

[11] Patent Number: 6,157,405
[45] Date of Patent: *Dec. 5, 2000

[54] APEX-ANGLE VARIABLE PRISM AND VIDEO CAMERA

[75] Inventor: Nobuchika Momochi, Kanagawa, Japan

[73] Assignee: Sony Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/896,586

[22] Filed: Jul. 18, 1997

[30] Foreign Application Priority Data

Jul. 22, 1996 [JP] Japan .................................. 8-209388

[51] Int. Cl.[7] .................................................. H04N 5/225
[52] U.S. Cl. ........................ 348/208; 348/335; 348/340
[58] Field of Search .................................... 348/208, 335, 348/340; 359/831, 837, 554, 557, 669; 396/55

[56] References Cited

U.S. PATENT DOCUMENTS

| 3,942,862 | 3/1976 | Furukawa et al. ........................ 359/557 |
| 5,305,040 | 4/1994 | Enomoto .................................. 354/202 |
| 5,398,132 | 3/1995 | Otani ........................................ 359/557 |
| 5,424,872 | 6/1995 | Lecuyer et al. .......................... 359/811 |
| 5,519,538 | 5/1996 | Maruyama ............................... 359/557 |
| 5,551,404 | 9/1996 | Misaka et al. ........................... 359/557 |
| 5,581,404 | 12/1996 | Misaka et al. ........................... 359/557 |
| 5,825,545 | 10/1998 | Kino et al. ............................... 359/557 |
| 5,844,719 | 12/1998 | Wada ....................................... 359/554 |
| 5,917,663 | 6/1999 | Suzuki .................................... 359/554 |

FOREIGN PATENT DOCUMENTS 0 168 794 A1  1/1986  European Pat. Off. .
2 103 384  2/1983  United Kingdom .

*Primary Examiner*—Wendy Garber
*Assistant Examiner*—Mitchell White
*Attorney, Agent, or Firm*—Frommer Lawrence & Haug, LLP.; William S. Frommer; Matthew K. Ryan

[57] ABSTRACT

In an apex-angle variable prism comprising a combination of a planoconcave lens and a planoconvex lens, at least one lens is simply and stably rotated along the spherical surfaces of these lens by using a compact actuator. In order to rotate the planoconvex lens along the spherical surface of the planoconcave lens, the one end of the planoconvex lens is supported by a pivot bearing disposed on the rotational center line $X_2$ which passes through the center $O_2$ of the radius of curvature of the sphere of the planoconvex lens, and the other end of the planoconvex lens is rotated along the rotational reference plane Z perpendicular to the rotational center line $X_2$ by using a compact DC motor.

11 Claims, 20 Drawing Sheets

APEX-ANGLE VARIABLE PRISM AND VIDEO CAMERA

BACKGROUND OF THE INVENTION

The present invention relates to an apex-angle variable prism which is most suitably applied to an apparatus for correcting the blurring of picture from an unsteady hold on a video camera, for example, and a video camera using the same.

In general, when a video camera is shaken due to an unsteady hold on the video camera or the like during a video pickup operation of the video camera, blurring of picture being picked up occurs. Therefore, there has been recently publicly known a picture-blurring correcting apparatus for a video camera in which an apex-angle variable prism is secured to the tip of the lens barrel of a video camera, blurring of picture being picked up or the like is detected by a built-in sensor, and the apex angle of the apex-angle variable prism is varied in accordance with the output of the sensor to incline the optical axis by the angle at which the video camera is shaken, thereby suppressing the blurring of the picture being picked up.

For example, according to an apex-angle variable prism described in Japanese Laid-open Patent Application No. Sho-61-269572, special liquid is sealed between two flat glass members which are covered by bellows, and the apex angle of the apex-angle variable prism is varied by adjusting the apex angle of one flat glass member to bend the optical axis in such a direction as to cancel out the shake amount of the video camera. Further, Japanese Laid-open Patent Application No. Hei-6-70220 or No. Hei-6-281889 discloses an apex-angle variable prism in which a planoconcave lens and a planoconvex lens, which have the same refractivity and spherical surfaces of the same radius of curvature, are confronted to each other so as to keep a slight gap between the spherical surfaces thereof, and the apex angle between the two flat surfaces of the two lens is varied by rotating one lens along the spherical surface thereof. Further, Japanese Laid-open Patent Application No. Hei-6-281889 describes a biaxial rotational driving mechanism in which a planoconcave lens is fixed and a planoconvex lens is rotated around perpendicularly intersecting two axes by a biaxial actuator to rotate the planoconvex lens in the two axial directions along the spherical surface of the planoconcave lens.

However, in the apex-angle variable prism as described in the Japanese Laid-open Patent Application No. Sho-62-26957, since the special liquid is sealed between the two flat glass members covered with the bellows, the viscous resistance of the liquid acts as drag when the angle of one flat glass member is varied. Therefore, the variation speed of the angle of the flat glass member has a limitation, and thus there is a problem that it is difficult to follow a high-speed shaking motion. Further, in the apex-angle variable prism as disclosed in the Japanese Laid-open Patent Application No. Hei-6-70220 or the Japanese Laid-open Patent Application No. Hei-6-281889, since the radius of curvature of the spherical surfaces of the planoconcave lens and the planoconvex lens cannot be set to such a so small value, it is difficult to rotatably dispose these lens around the center of the radius of curvature of the spherical surfaces in a narrow space. Even if the spherical surfaces of these lens are brought into directly sliding contact with each other, the spherical surfaces are damaged, and also the variation speed of the apex angle is suppressed by the sliding resistance of the lenses, so that the response to the high-speed shaking motion is reduced.

The biaxial rotational driving mechanism for rotating the planoconvex lens in the two axial directions along the spherical surface of the planoconcave lens as described in Japanese Laid-open Patent Application No. Hei-6-281889, a horizontal rotational member must use a gyroscope structure for supporting a horizontal rotational member through a vertical first support shaft on a lens support member so as to be rotatable in the horizontal direction and also supporting a vertical rotational member holding the outer periphery of the planoconvex lens on a horizontal rotational member through two horizontal second support shafts so as to be rotatable in the vertical direction. Therefore, the overall biaxial rotational driving mechanism is designed in a large-size and heavy weight structure. Accordingly, the inertia when the planoconvex lens is rotated in the two axial directions is large, and an actuator of large capacity must be used, so that there is a problem that the cost increases remarkably and the response to the high-speed shaking motion is reduced.

SUMMARY OF THE INVENTION

The present invention has been implemented to solve the above problems, and has an object to provide an apex-angle variable prism having a combination of a planoconcave lens and a planoconvex lens in which at least one lens can be rotationally driven simply and stably along the spherical surfaces of these lens by using a compact actuator, and also space saving can be achieved.

In order to attain the above object, according to an apex-angle variable prism of the present invention, in order to rotate at least one of a planoconcave lens and a planoconvex lens relatively to the other lens along the spherical surfaces thereof, the spherical surfaces of the planoconcave lens and the planoconvex lens being confronted to each other, a rotational fulcrum portion is disposed at one end side of the one lens, and a rotational driving portion is disposed at the other end side.

According to the apex-angle variable prism of the present invention thus constructed, when at least one of the planoconcave lens and the planoconvex lens whose spherical surfaces are confronted to each other is rotationally driven along the spherical surfaces thereof relatively to the other lens, the other end side of the one lens is rotated around the rotational fulcrum portion at the one end side thereof by the rotational driving portion, so that the one lens can be rotated stably without backlash.

DETAILED DESCRIPTION OF THE PREFERRED EMBODIMENTS

An embodiment of an apex-angle variable prism in which the present invention is applied to a picture blurring correction apparatus for a video camera will be hereinafter described.

Description on the Principle of Apex-Angle Variable Prism

Figure 1A:
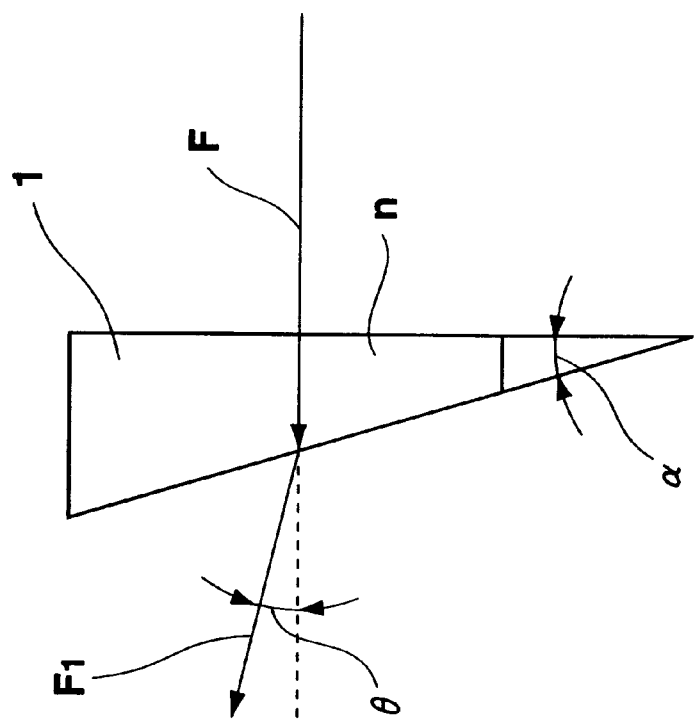
FIGS. 1A and 1B are diagrams showing an apex-angle variable prism comprising a combination of a wedge type prism, a planoconcave lens and a planoconvex lens.

First, the principle of the apex-angle variable prism will be described with reference to FIGS. 1A and 1B. That is, a wedge type prism 1 shown in FIG. 1A has a refractivity of n and an apex angle of α, and in this wedge type prism 1, the optical axis $F_1$ of emitted light has a refractive angle of θ to the optical axis F of incident light. The relationship between the refractive angle θ and the apex angle α is represented in (equation 1).

$$\theta = (n-1)\alpha \qquad (1)$$

Figure 1B:
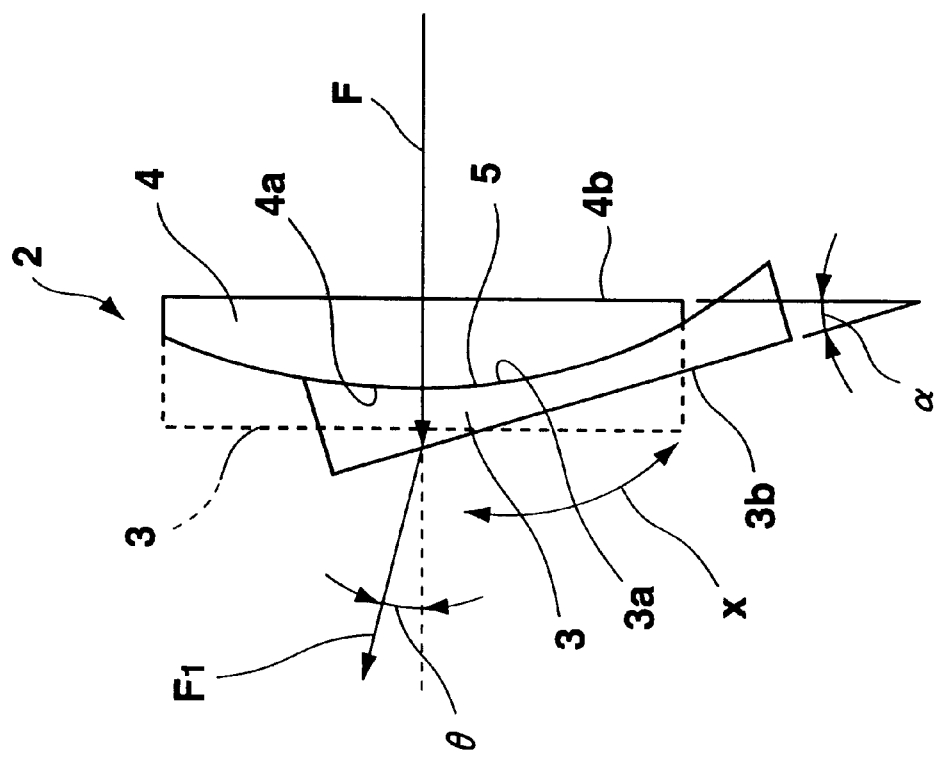

As shown in FIG. 1B, the apex-angle variable prism 2 of the present invention comprises a planoconcave lens 3 and a planoconvex lens 4, and these planoconcave lens 3 and planoconvex lens 4 are confronted to each other so as to keep a slight gap 5 between the spherical surfaces 3a and 4a thereof. The planoconcave lens 3 and the planoconvex lens 4 are designed so as to have the same refractivity n and so that the spherical surfaces thereof have the same radius of curvature. As shown by a dotted line in FIG. 1B, the apex-angle variable prism 2 does not refract the light when the flat surfaces 3b and 4b of the planoconcave lens 3 and the planoconvex lens 4 are perpendicular to the optical axis F. However, when the planoconcave lens 3 and the planoconvex lens 4 are relatively rotated in the direction of an arrow x along the spherical surfaces 3b and 4b thereof to form an apex angle α between the flat surfaces 3b and 4b as shown by a solid line in FIG. 1B, the optical axis $F_1$ of emitted light to the optical axis F of incident light occurs according to (equation 1) like the wedge type prism 1. Therefore, by setting the relative rotational direction of the planoconcave lens 3 and the planoconvex lens 4 along the spherical surfaces 3a and 4b to perpendicular two axial directions and freely controlling the rotational angle therebetween, the values of the refraction direction and the refractive angle θ of the optical axis $F_1$ of the emitted light can be freely varied in the up and down direction and in the right and left direction. This principle is applied to the picture blurring correction apparatus for a video camera which will be next described.

Summary of Picture Blurring Correction Apparatus for Video Camera

Figure 2A:
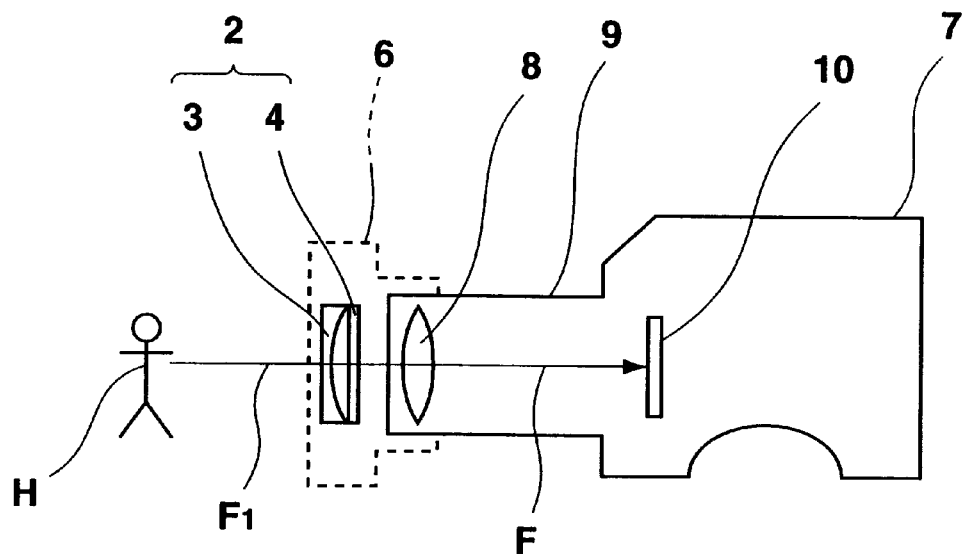
FIGS. 2A and 2B are diagrams showing the picture blurring correction apparatus of the video camera.

Next, the summary of the picture blurring correction apparatus for a video camera will be described with reference to FIGS. 2A and 2B. That is, the picture blurring correction apparatus 6 contains the apex-angle variable prism shown in FIG. 1B, and it is secured on the optical axis F of an imaging lens 8 thereof at the tip of a lens barrel 9 containing therein the image lens 8 of a video camera 7. The picture blurring correction apparatus 6 contains a shake amount detection sensor (not shown) for detecting the shaking direction and the shaking amount of the shaking motion, vibration or the like of the video camera 7 in the perpendicular two axial directions. First, FIG. 2A shows a stationary state of the video camera 7 during a video pickup operation. At this time, an incident light $F_1$ to a subject H is superposed on the optical axis F of the imaging lens through the apex-angle variable prism 2, and the image of the subject is accurately focused on the center portion of an image pickup element 10 such as a CCD or the like.

Figure 2B:
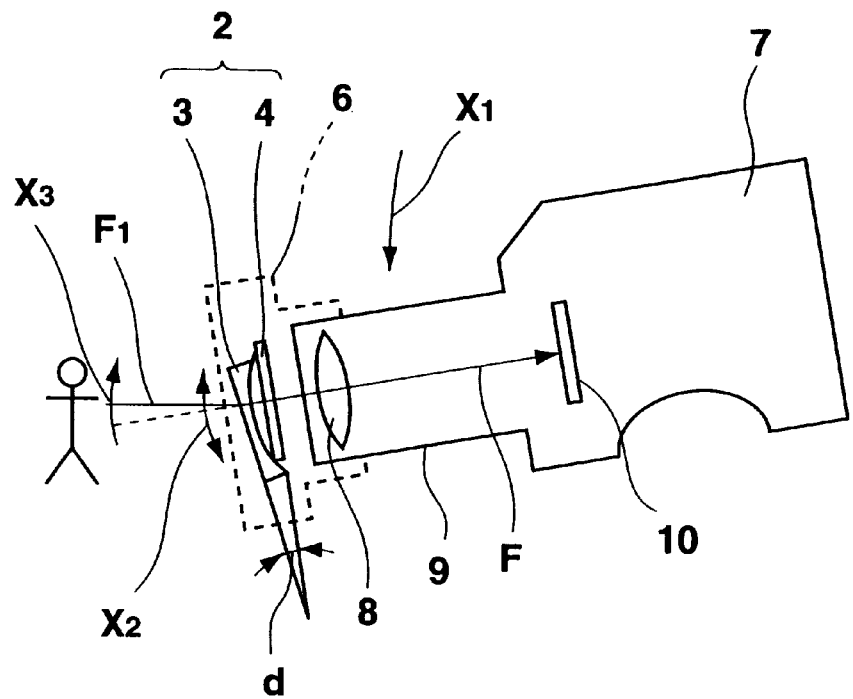

Next, FIG. 2B shows a vibrational motion such as camera shake or the like under the video pickup operation. When the video camera 7 is shaken, the shaking direction and the shaking amount of the video camera are detected by the shake amount detection sensor, and the camera shake correction apparatus 6 varies the apex angle α of the apex-angle variable prism 2 so as to cancel out the shake amount on the basis of the output of the shake amount detection sensor. That is, when the video camera 6 is shaken in the direction of an arrow $x_1$, the planoconcave lens 3 and the planoconvex lens 4 are relatively rotated in the direction of an arrow $x_2$ so as to cancel out the shake amount to vary the apex angle α so as to cancel out the shake amount of the video camera. At this time, the incident light $F_1$ from the subject H is refracted by an angle θ in the direction as an arrow $X_3$ to the optical axis F of the imaging lens 7 so as to cancel out the shake amount, and the subject image H is focused onto the center portion of the imaging element 10. That is, irrespective of the shake of the video camera in the direction of the arrow $x_1$, the shake amount is canceled out by varying the apex angle α of the apex-angle variable prism 2 to perform such an optical correction that the deflection of the subject image H to be focused on the imaging element 10 is canceled out.

Description of Principle of Lens Swing Mechanism of Apex-Angle Variable Prism Next, the principle of a lens swing mechanism of the apex-angle variable prism will be described with reference to FIGS. 3, 14, 18 to 20. That is, when the planoconcave lens 3 and the planoconvex lens 4 of the apex-angle variable prism 2 shown in FIG. 1B are rotated relatively to the spherical surfaces 3a and 4a thereof, the lens swing mechanism 11 can easily rotate these lens by using a compact actuator, and these lens can be rotated stable and with no loss and no backlash while the spherical surfaces thereof are not brought into contact with each other and a slight gap 5 is kept between the spherical surfaces of these lens. In addition, the space can be saved and the response can be enhanced due to the compact design of the overall lens swing apparatus 11.

Figure 18:
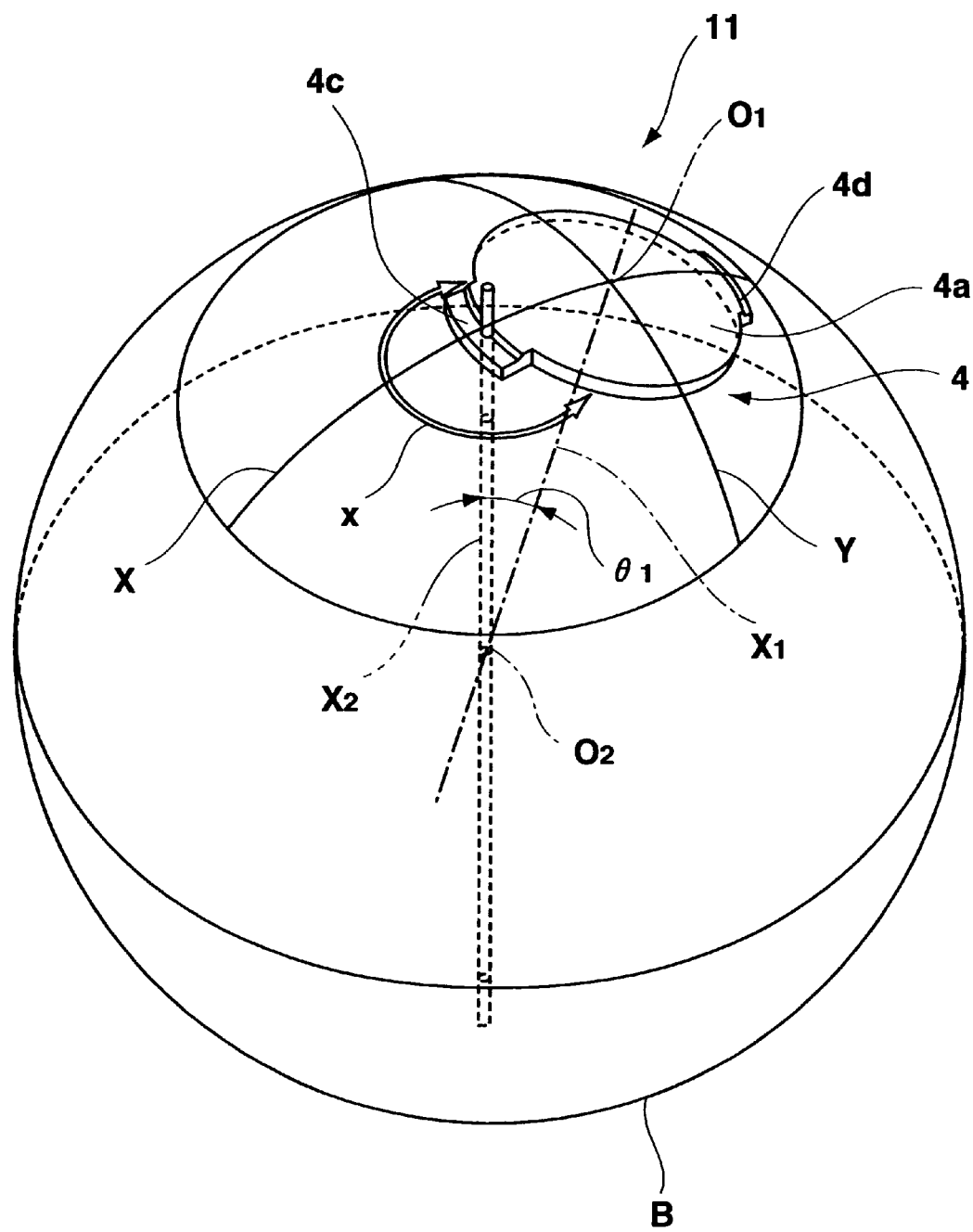
FIG. 18 is a diagram showing the principle of the lens swing mechanism of the present invention.
Figure 19:
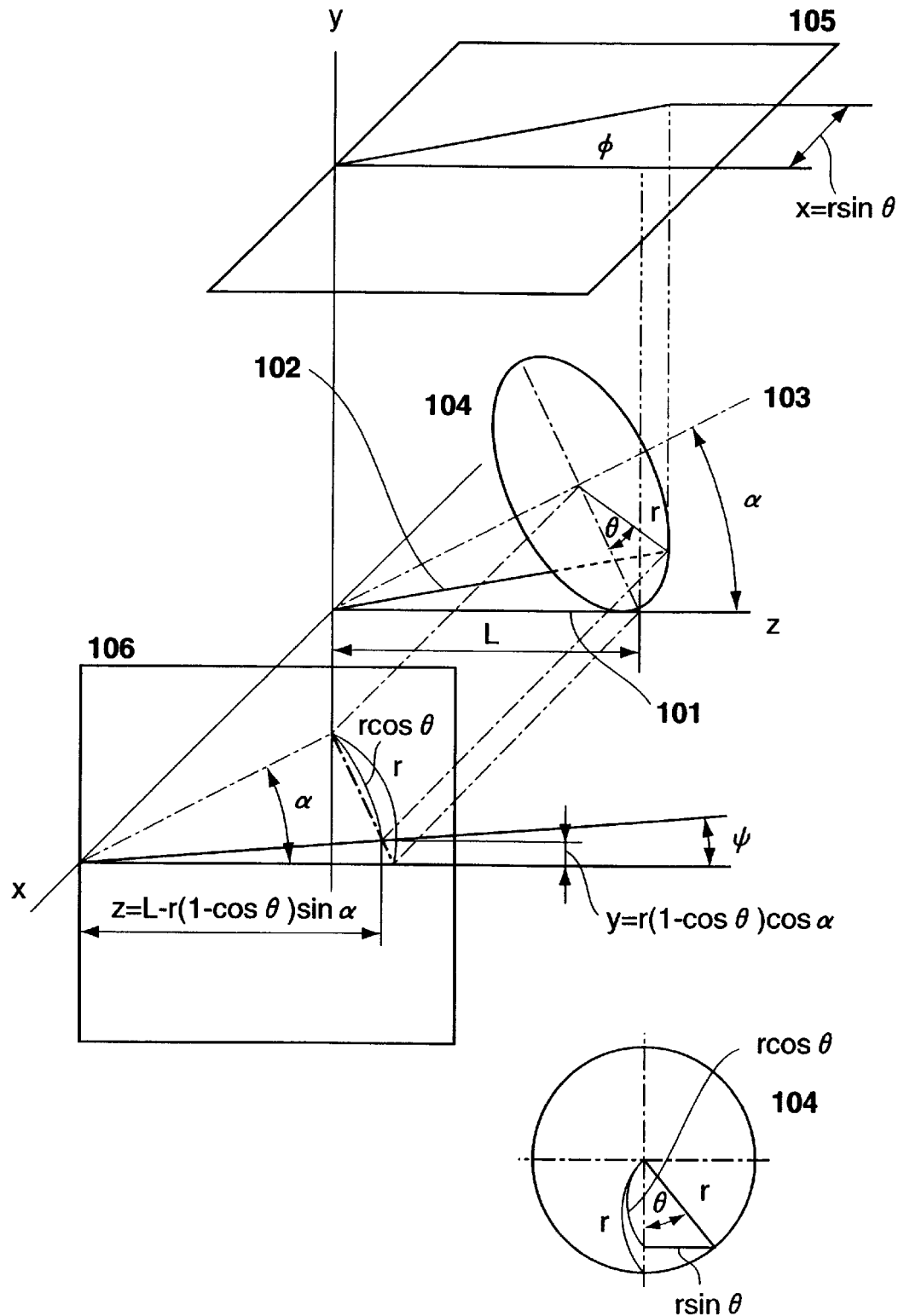
FIG. 19 is a diagram showing an analysis of the effect of a plane shaking motion when the planoconvex lens in the lens swing mechanism of the present invention is rotated.
Figure 20:
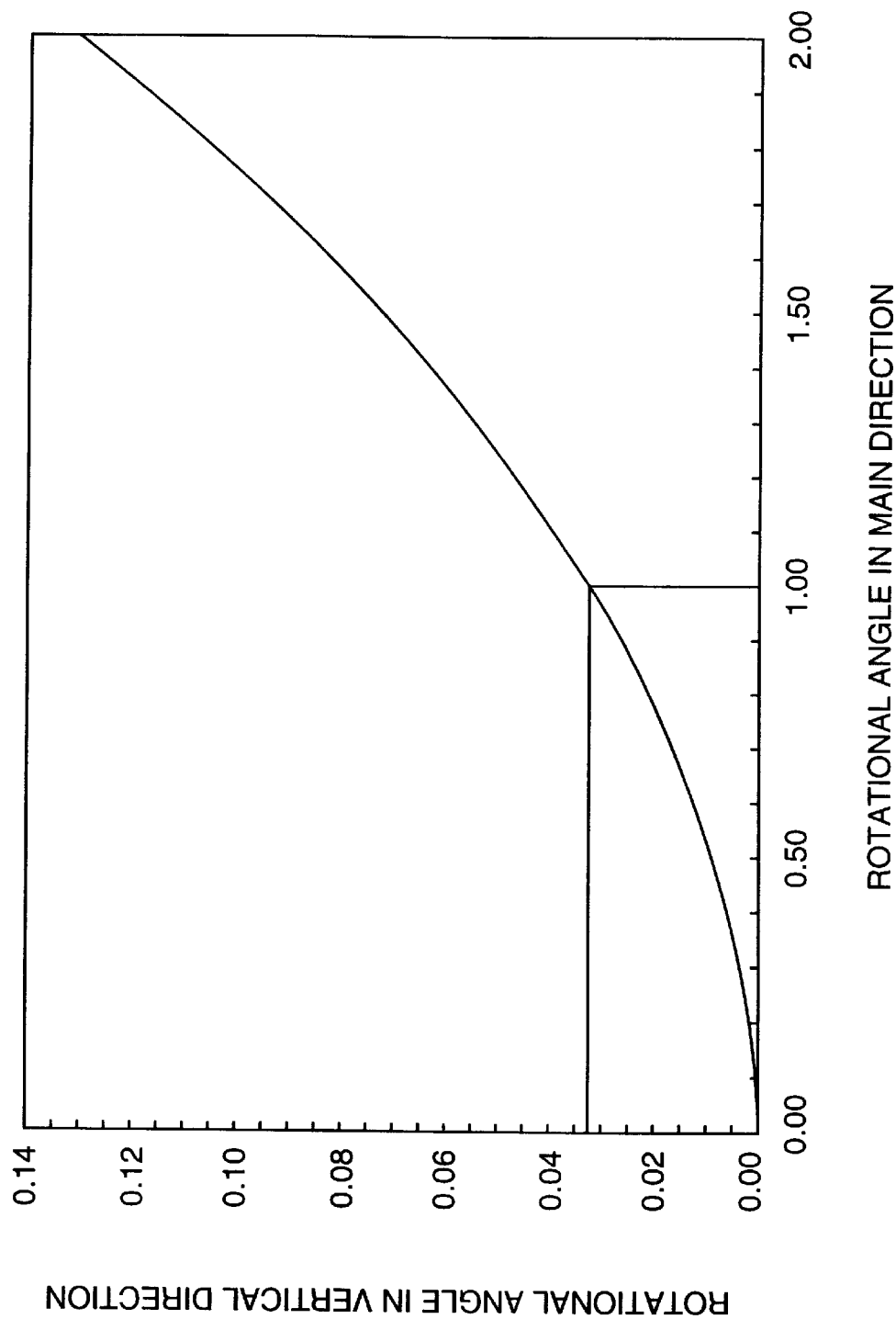
FIG. 20 is a graph showing the plane shaking situation when the planoconvex lens is rotated.

Therefore, the rotational driving principle of the planoconvex lens 4 will be described with reference to FIGS. 3, 4 and 18. That is, when the radius of curvature R of the spherical surface 4a of the planoconvex lens 4 is equal to the radius of curvature of the virtual sphere B having a large diameter, the normal $X_1$ which passes through the center $O_1$ of the spherical surface 4a of the planoconvex lens 4 and is perpendicular to the flat surface 4b of the planoconvex lens 4 passes through the center $O_2$ of the virtual sphere B. Here, when the planoconvex lens 4 is rotated in the direction of an arrow x around the rotational center line $X_2$ which is a reference line in a radial direction which is inclined to the normal line $X_1$ by a predetermined angle $\theta_1$ and passes through the center $O_2$ of the virtual sphere B, the spherical surface 4a of the planoconvex lens 4 is never out of the spherical surface of the virtual sphere if the radius of curvature R is constant. That is, the spherical surface 4a of the planoconvex lens 4 is rotated in the direction of the arrow x accurately along the spherical surface of the virtual sphere B. Further, it is needless to say that even when the rotational reference plane Z which is perpendicular to the rotational center line $X_2$ is rotated in the direction of the arrow x around the rotational center line $X_2$, the rotational reference plane Z is never varied.

According to the present invention, one end 4c side of the planoconvex lens 4 is supported on the rotational center line $X_2$ by the rotational fulcrum portion 12, and the rotational driving portion 13 is disposed at the other end 4d side of the planoconvex lens 4. The planoconvex lens 4 is rotated in the direction of the arrow x around the rotational center line $X_2$ with the rotational fulcrum portion at the center by the rotational driving portion 13 while the other end 4d side is guided along the rotational reference plane Z by a rotational guide 14 serving as guide means, whereby the radius of curvature R can be kept constant, and the planoconvex lens 4 can be rotated in the direction of the arrow x while the spherical surface 4a of the planoconvex lens 4 is kept accurately along the spherical surface of the virtual sphere B. This enables the planoconcave lens 3 and the planoconvex lens 4 to be relatively and stably rotated in the direction of the arrow x while the slight gap 5 is kept between the spherical surfaces 3a and 4a of these lens as shown in FIG. 1B.

In the lens swing mechanism 11, when the normal $X_1$ of the planoconvex lens 4 is disposed on the optical axis shown in FIGS. 1A and 1B and FIGS. 2A and 2B, the planoconvex lens 4 is rotated around the rotational center line $X_2$ which is inclined to the optical axis F by a predetermined angle $\theta_1$, and thus the locus of the rotational motion of the planoconvex lens 4 is not linear, but curved. Therefore, the rotation of the planoconvex lens 4 inclines the flat surface 4b of the planoconvex lens 4 to the flat surface 3b of the planoconcave lens 3. Accordingly, the degree of the inclination of the flat surface 4b of the planoconvex lens 4 will be considered with reference to FIG. 19.

The space orthogonal coordinate is set as follows: the z axis is set to the optical axis direction of the planoconvex lens 4 is set to the z axis; the y axis is set to the direction containing the rotational axis of the planoconvex lens 4 within the plane perpendicular to the z axis; and the x axis is set to be perpendicular to the z axis. Reference numeral 101 represents a normal vector (length L) representing an initial inclination of the lens flat surface, and its start point is set to the origin of this coordinate system. Reference numeral 103 represents a line which passes through the origin and is parallel to the rotational axis, and an intersection angle between the line and the z axis is equal to $\alpha$. Reference numeral 101 is rotated around the line 103.

Reference numeral 102 represents a normal vector after the normal vector is rotated because the lens is rotated. The end point of this vector draws a circle 104 having a radius r on the plane which contains the end point P of the normal vector 101 and is perpendicular to the line 103. Here, r is represented by (equation 2).

$$r = L \sin \alpha \qquad (2)$$

Reference numeral 105 represents a plane which is perpendicular to the y axis, and reference numeral 106 represents a plane which is perpendicular to the x axis. The motion of the vector projected onto these two planes will be hereunder described. First, when the angle of an arc obtained when the normal vector is rotated on the circle 104 is represented by $\theta$, the length of the radius vector of the circle 104 which is projected on the xz plane 105 is represented by $r\sin\theta$, and that projected on the yz plane 106 is represented by $r\cos\theta$. Accordingly, representing the coordinate of the end point P of the rotated normal vector by (x,y,z), (equation 3)→(equation 4)→(equation 5)

$$x = r \sin \theta = L \sin \alpha \sin \theta \qquad (3)$$

$$y = r(1 - \cos \theta) \cos \alpha = \sin \alpha \cos \alpha (1 - \cos \theta) \qquad (4)$$

$$z = L - r(1 - \cos \theta) \sin \alpha = L - L \sin^2 \alpha (1 - \cos \theta) \qquad (5)$$

Accordingly, the rotational angle $\phi$ of the normal vector projected on the XZ plane is represented by (equation 6), and the rotational angle 104 of the normal vector projected on the XZ plane is represented by (equation 7).

$$\tan\phi = \frac{x}{z} = \frac{\sin\alpha \cdot \sin\theta}{1 - \sin^2\alpha \cdot (1 - \cos\theta)} \qquad (6)$$

$$\tan\psi = \frac{y}{z} = \frac{\sin\alpha \cdot \cos\alpha(1 - \cos\theta)}{1 - \sin^2\alpha \cdot (1 - \cos\theta)} \qquad (7)$$

Of these, $\phi$ represents the rotational angle in a desired direction and $\psi$ represents an error component. Here, $\phi$ and $\psi$ are calculated when the intersecting angle $\alpha$ between the optical axis and the rotational axis is set to 30°, and the calculation result is represented by a graph of FIG. 20. As is apparent from FIG. 20, when $\phi$ is small, for example, $\phi=1°$, the rotational angle $\psi$ which is perpendicular to the $\phi$ satisfies $\psi \approx 0.0326°$ and thus it is smaller than 0.33%. However, when the value of $\phi$ is smaller than the above value, this rate is reduced to an negligibly small value as a correction motion of the optical axis.

As described above, the position of the confronting spherical surfaces 3a and 4a is not varied even by rotating the planoconvex lens 4 relatively to the planoconcave lens 3 which is disposed to confront the planoconvex lens 4 while keeping a slight gap therebetween, and only the flat surface side thereof is inclined. Therefore, only the intersecting angle between the two confronting flat surfaces of the planoconcave lens and the planoconvex lens, and thus the apex-angle variable prism 2 can be fabricated. The above mechanism can be formed in the same manner for the planoconcave lens 3. By actuating these lens in the two perpendicular axial directions, the picture blurring correction of the video camera as described above can be performed.

Description of Picture Blurring Correction Apparatus

Next, the picture blurring correction apparatus will be described with reference to FIGS. 3 to 17. First, as shown in FIGS. 14 to 17, in the picture blurring correction apparatus 6, the apex-angle variable prism 2 comprising the planoconcave lens 3 and the planoconvex lens 4 is installed in a cylindrical lens holder 16, and a pair of lens swing mechanisms 11 for rotating the planoconcave lens 3 and the planoconvex lens 4 in the two perpendicular axial directions respectively are secured at the outside of the lens holder 16. The picture blurring correction apparatus 6 is detachably secured by the lens holder 16 on the outer periphery of the tip of the lens barrel 9 in which the imaging lens of the video camera 7 is contained. That is, the cylindrical portion 16a of the lens holder 16 is inserted into the outer periphery of the tip of the lens barrel 9, and the lens holder 16 is coaxially detachably secured to the lens barrel 9 so that a clamp ring 18 which is formed of rubber or the like and clamped by plural clamp screws is pressed against the outer periphery of the tip of the lens barrel 9. The clamp ring 18 is held in a ring shape 16c which is formed on the inner periphery of the end portion at the opposite side to a flange portion 16b of the cylindrical portion 16 a, and is designed to be engaged with the narrow ring groove 9a which is formed on the outer periphery of the tip of the lens barrel 9. Further, in the flange portion 16 b which is integrally formed on the outer periphery of the tip of the lens holder cylindrical portion 16 a, a pair of rotational fulcrum portion fixing notch 19 and a rotational driving portion fixing notch 20 are formed at each of two places which are confronted to each other on the two perpendicular axes, the X axis and the Y axis.

The apex-angle variable prism comprising the combination of the planoconcave lens 3 and the planoconvex lens 4 is installed in the lens holder 16 in the direction perpendicular to the optical axis F. In this case, the planoconcave lens 3 is disposed outside, the planoconvex lens 4 is disposed inside, and the planoconvex lens 4 is disposed to be nearer to the imaging lens 8 of the tip of the lens barrel to the extent that it is not brought into contact with the imaging lens 8, thereby aiming at the compact design of the overall picture blurring correction apparatus 6. The planoconcave lens 3 and the planoconvex lens 4 are designed to be rotated in the arrow x direction and the arrow y direction by the respective lens swing mechanism 11 on the X-axis and the Y axis which are the two axes perpendicular to each other.

Figure 3:
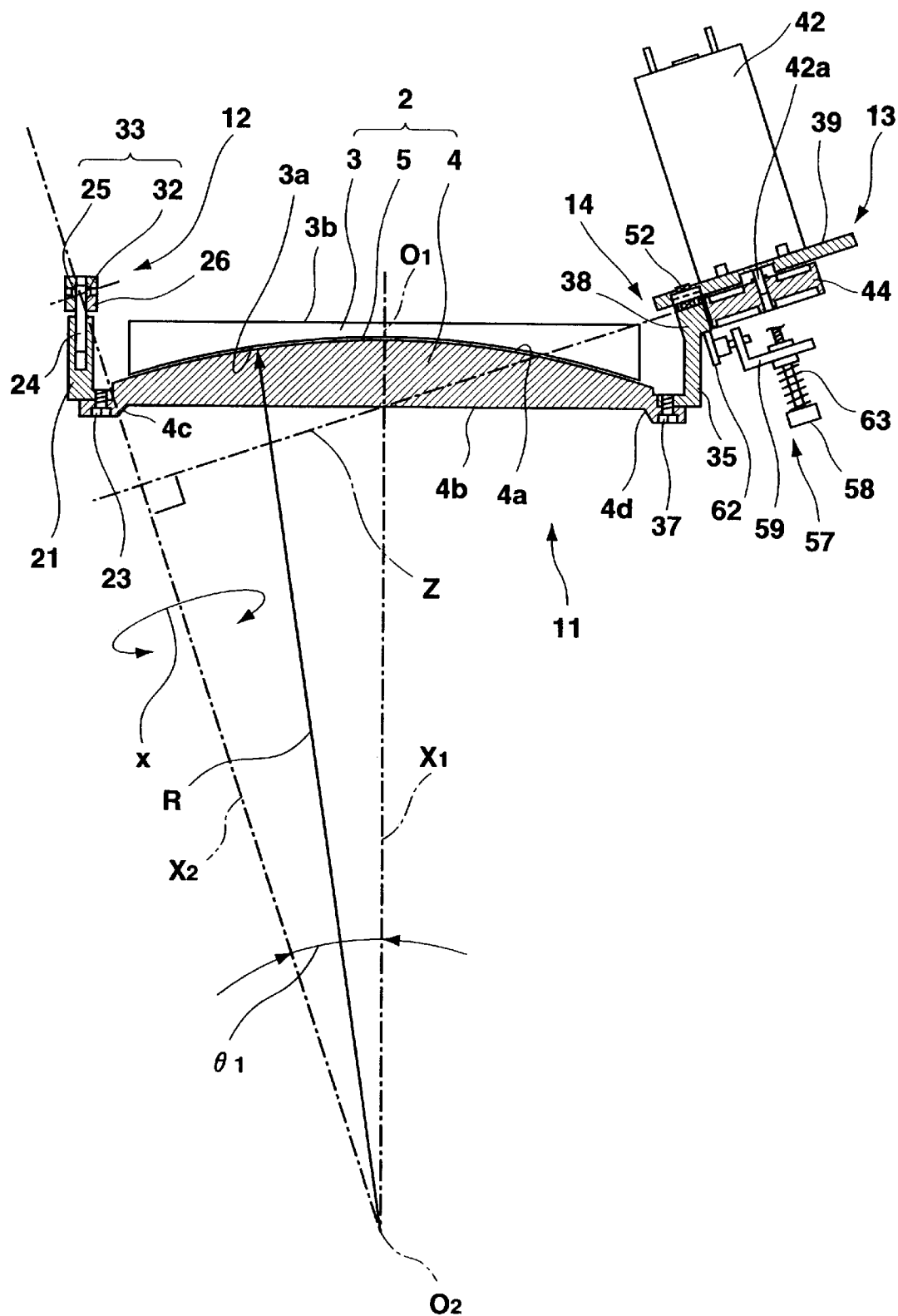
FIG. 3 is a partially notched side view showing a lens swing mechanism for driving a planoconvex lens according to an embodiment of an apex-angle variable prism to which the present invention is applied.
Figure 4:
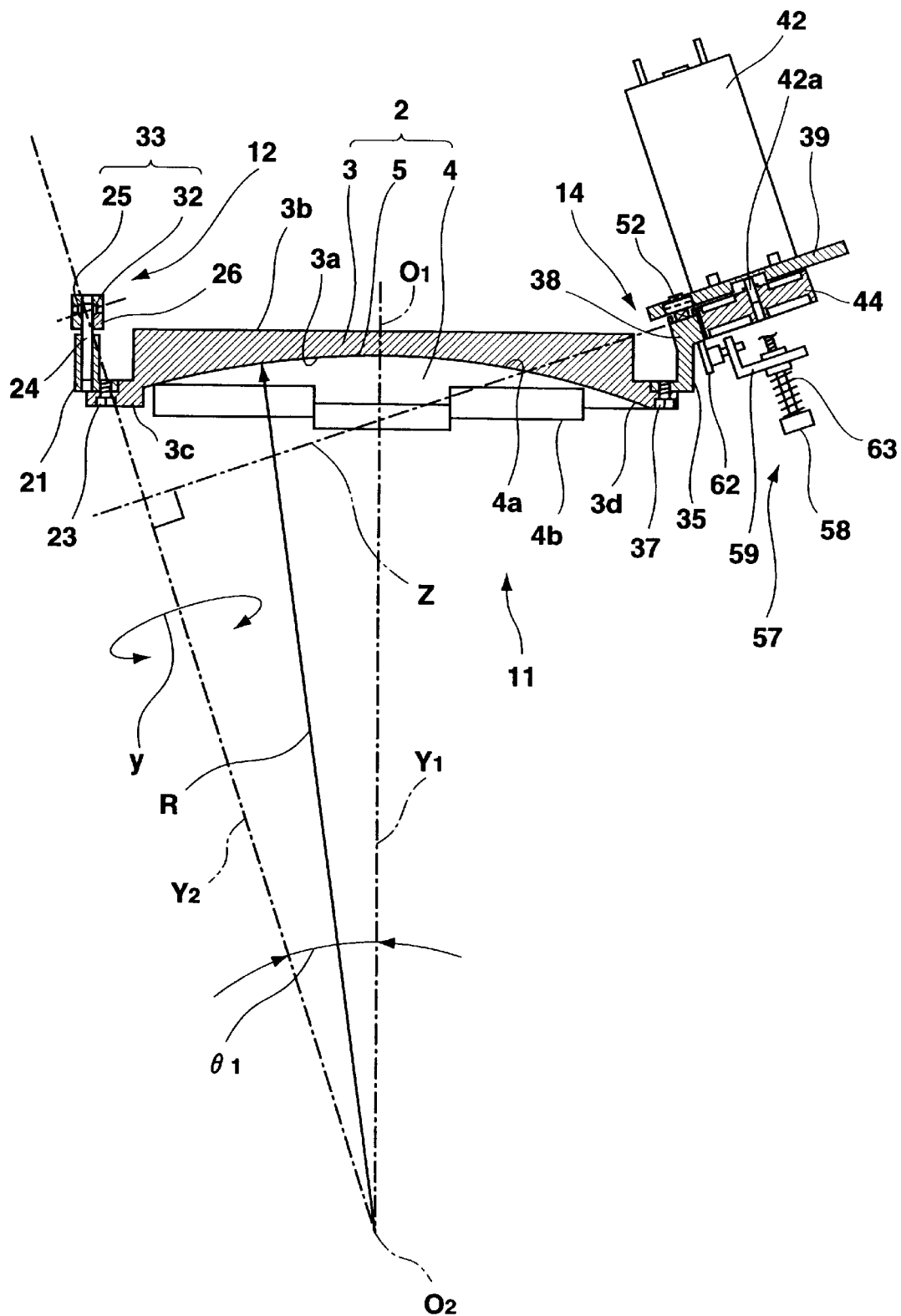
FIG. 4 is a partially notched side view showing a swing mechanism for driving a planoconcave lens of the embodiment.
Figure 5:
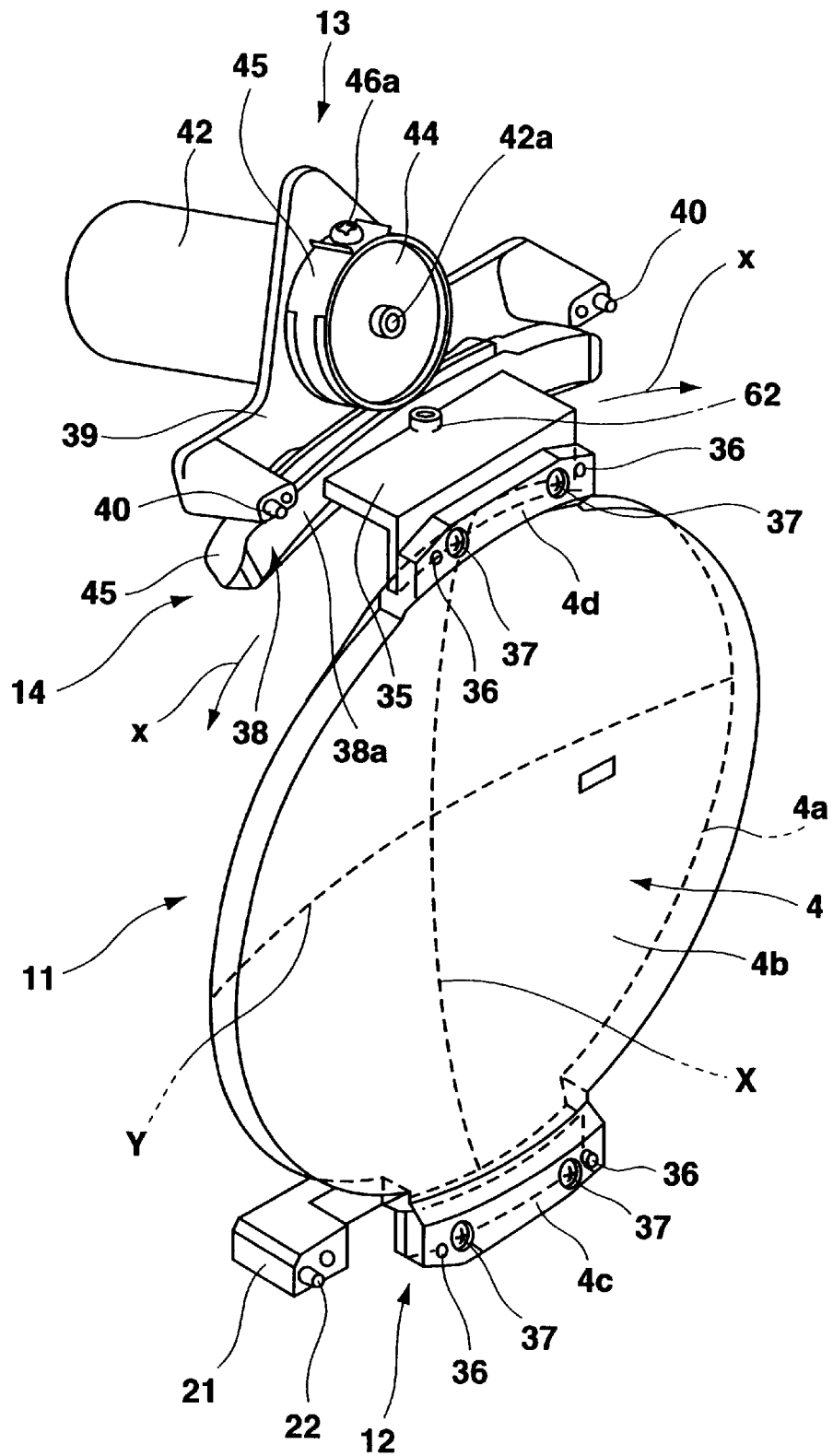
FIG. 5 is a perspective view showing a lens swing mechanism of FIG. 3.
Figure 14:
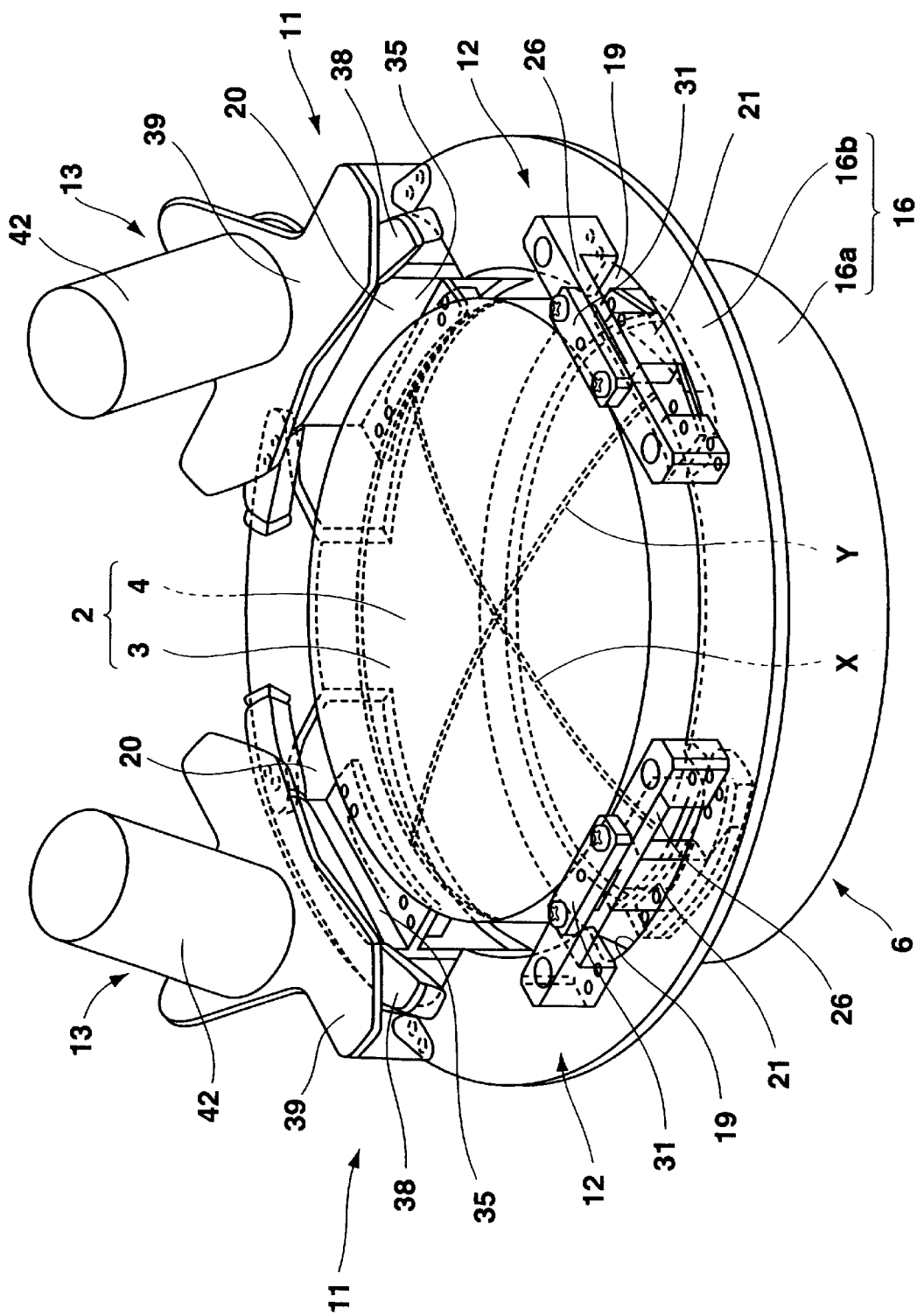
FIG. 14 is a perspective view showing the overall picture blurring correction apparatus.
Figure 15:
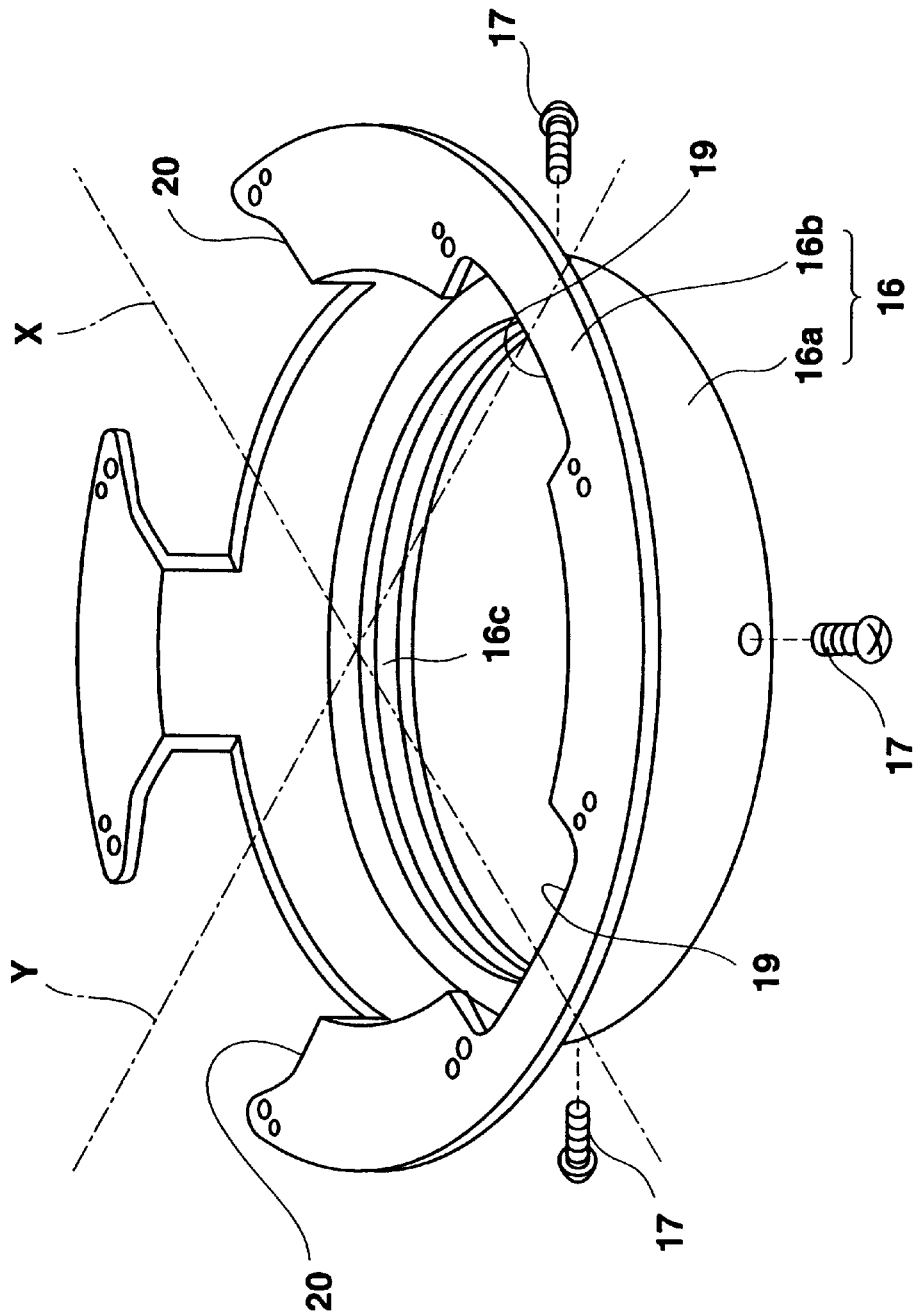
FIG. 15 is a perspective view showing a lens holder of the picture blurring correction apparatus.
Figure 16:
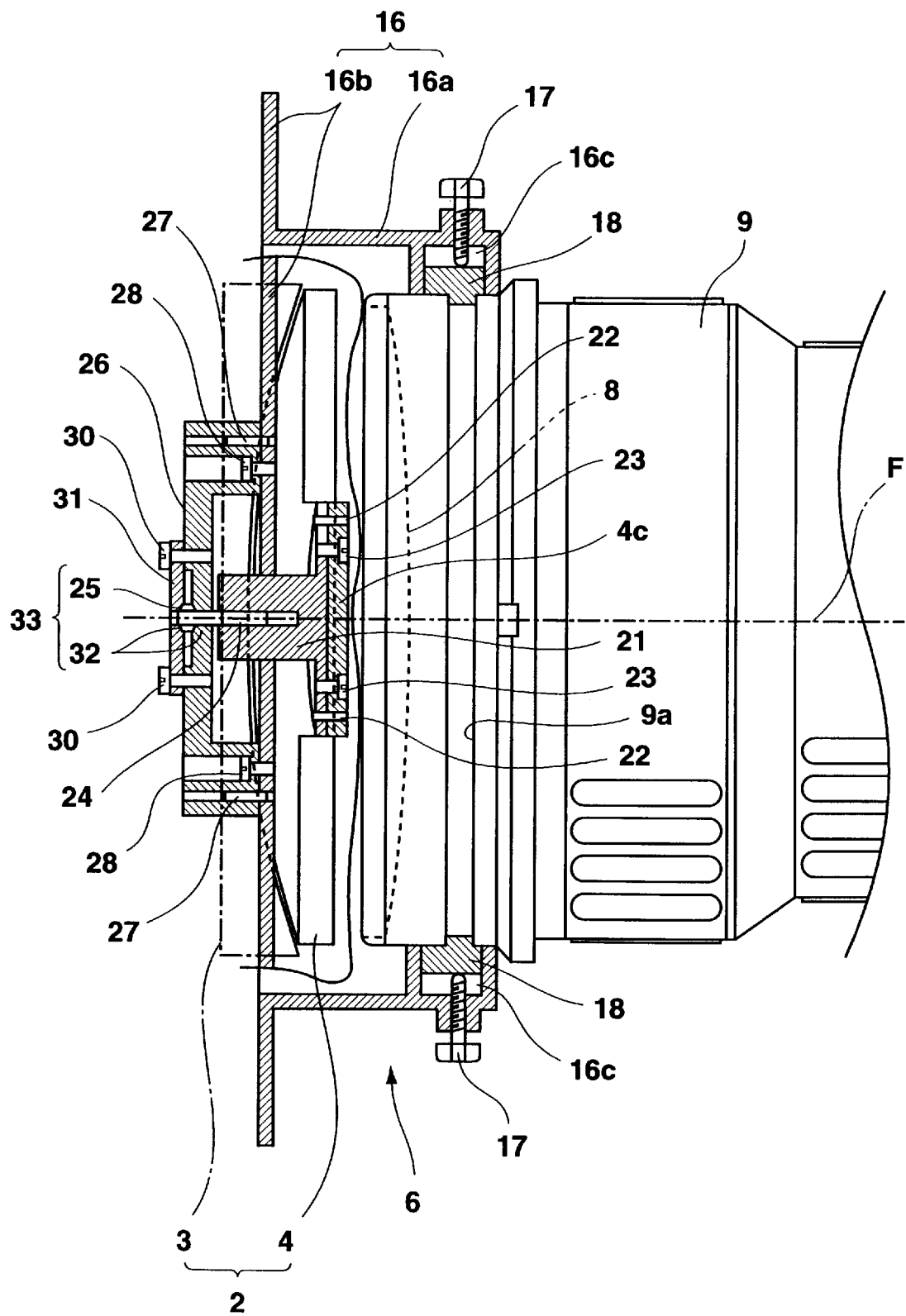
FIG. 16 is a partially notched side view showing a fixing method of the picture blurring correction apparatus to the tip of the lens barrel of the video camera.
Figure 17:
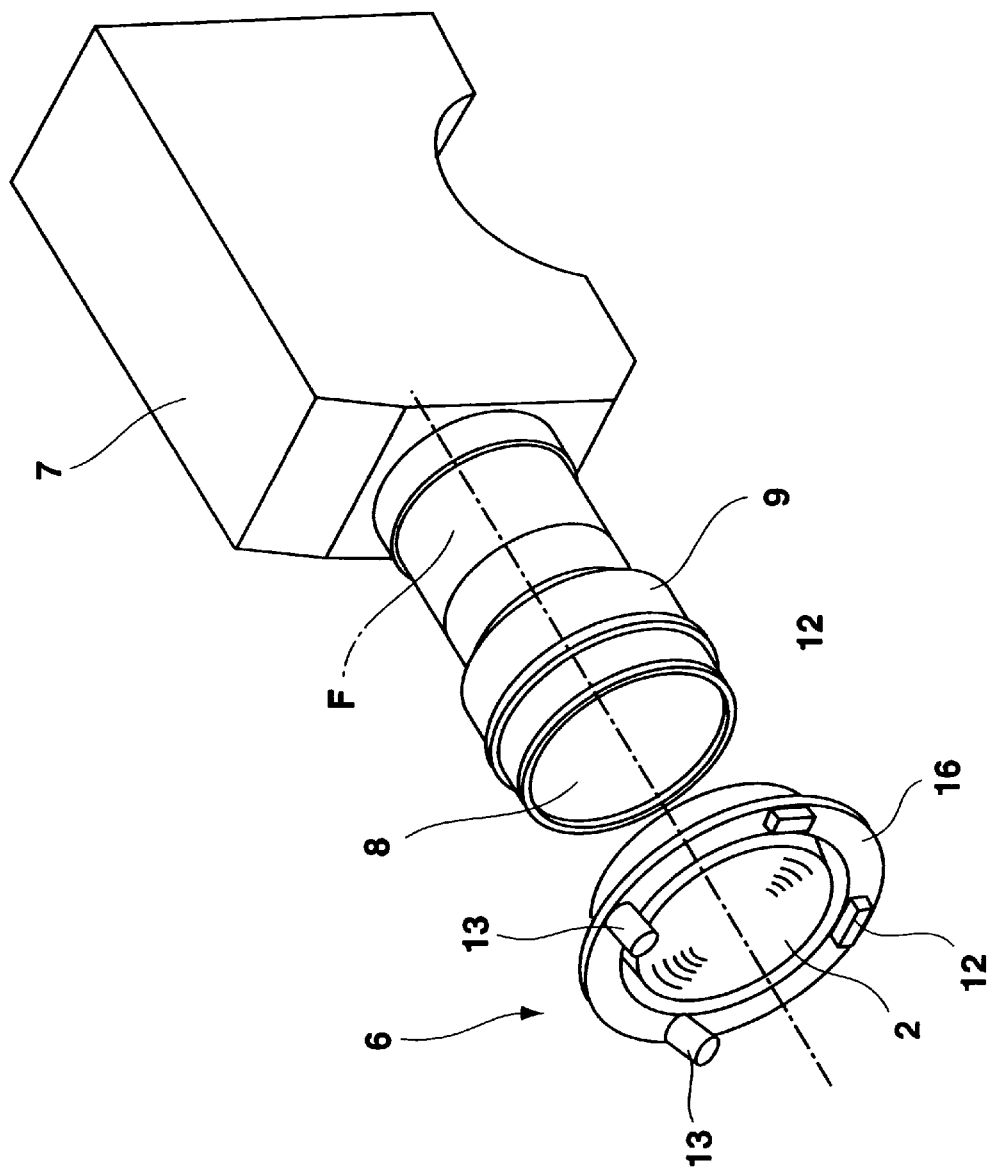
FIG. 17 is a schematic exploded perspective view showing the video camera and the picture blurring correction apparatus.

That is, the plane containing the normal $X_1$ and the rotational center line $X_2$ of the planoconvex lens 4 as shown in FIG. 3 is disposed on the X axis shown in FIG. 14, and with respect to the planoconcave lens 3 shown in FIG. 4, like the planoconvex lens 4, the plane containing the normal $Y_1$ and the rotational center line $Y_2$ is disposed on the Y axis shown in FIG. 14. The planoconvex lens 4 and the planoconcave lens 3 are rotated in the arrow x direction and the arrow y direction by the lens swing mechanisms 11 having the same construction. In the following description, only the lens swing mechanism 11 of the planoconvex lens 4 will be described, and the description of the lens swing mechanism 11 of the planoconcave lens 3 is omitted.

That is, first, the rotational fulcrum portion 12 for supporting one end 4c of the planoconvex lens 4 will be described with reference to FIGS. 3, 7, 14 and 16. A support member 21 is fixed to one end 4c of the planoconvex lens 4 by a pair of a positioning pin 22 and a screw 23, and a steel ball 25 is press-fitted to the outer periphery of the tip of the support shaft 24 which is press-fitted to the center of a lens support member 21. At the outside of the notch 19 of the flange portion 16 b in the lens holder 16, a substantially U-shaped bearing member 26 which is disposed so as to extend over the notch 19 is fixed to the outside of the flange portion 19 by a pair of positioning pins 27 and 28, the lens support member 21 is inserted into the notch 19 from the inside, and the steel ball 25 is rotatably secured to the outside of the bearing member 26. In this case, the support shaft 24 of the steel ball 25 is swingably inserted through an insertion hole 29 which is formed at the center of the bearing member 26, and the steel ball 25 is supported so as to be rotatable around the center thereof without backlash between the bearing member 26 and a bearing cover 31 which is fixed to the outside of the center portion of the bearing member 26 by a pair of screws 30. A pair of conical steel ball receiving surfaces 32 formed in the bearing member 26 and the bearing cover 31, and the steel ball 25 constitute a pivot bearing 33. As shown in FIG. 3, the center of the steel ball 25 of the pivot bearing 33 is disposed on the rotational center line $X_2$.

Figure 6:
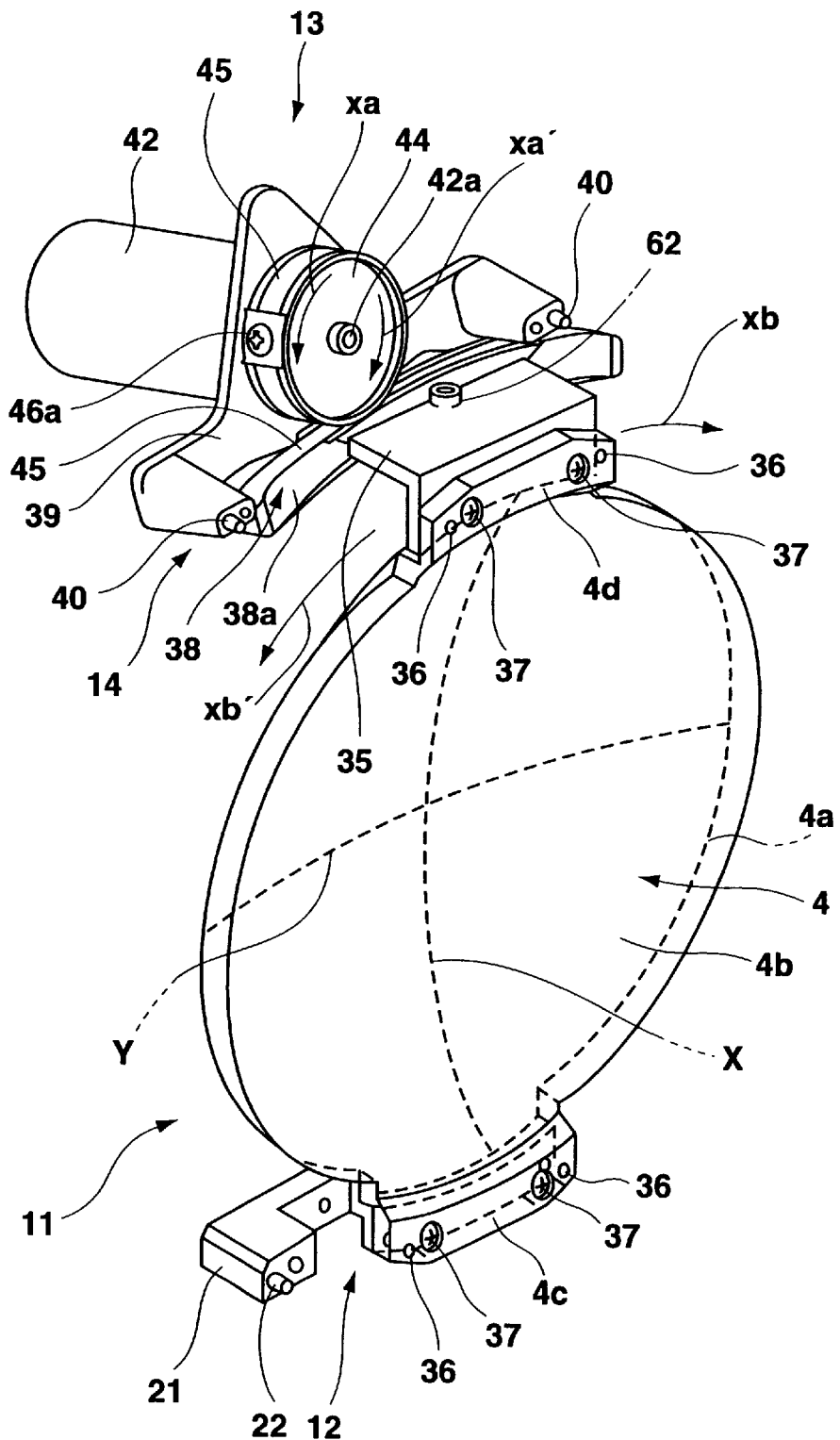
FIG. 6 is a perspective view showing the swing operation of the planoconvex lens in the lens swing mechanism of FIG.
Figure 7:
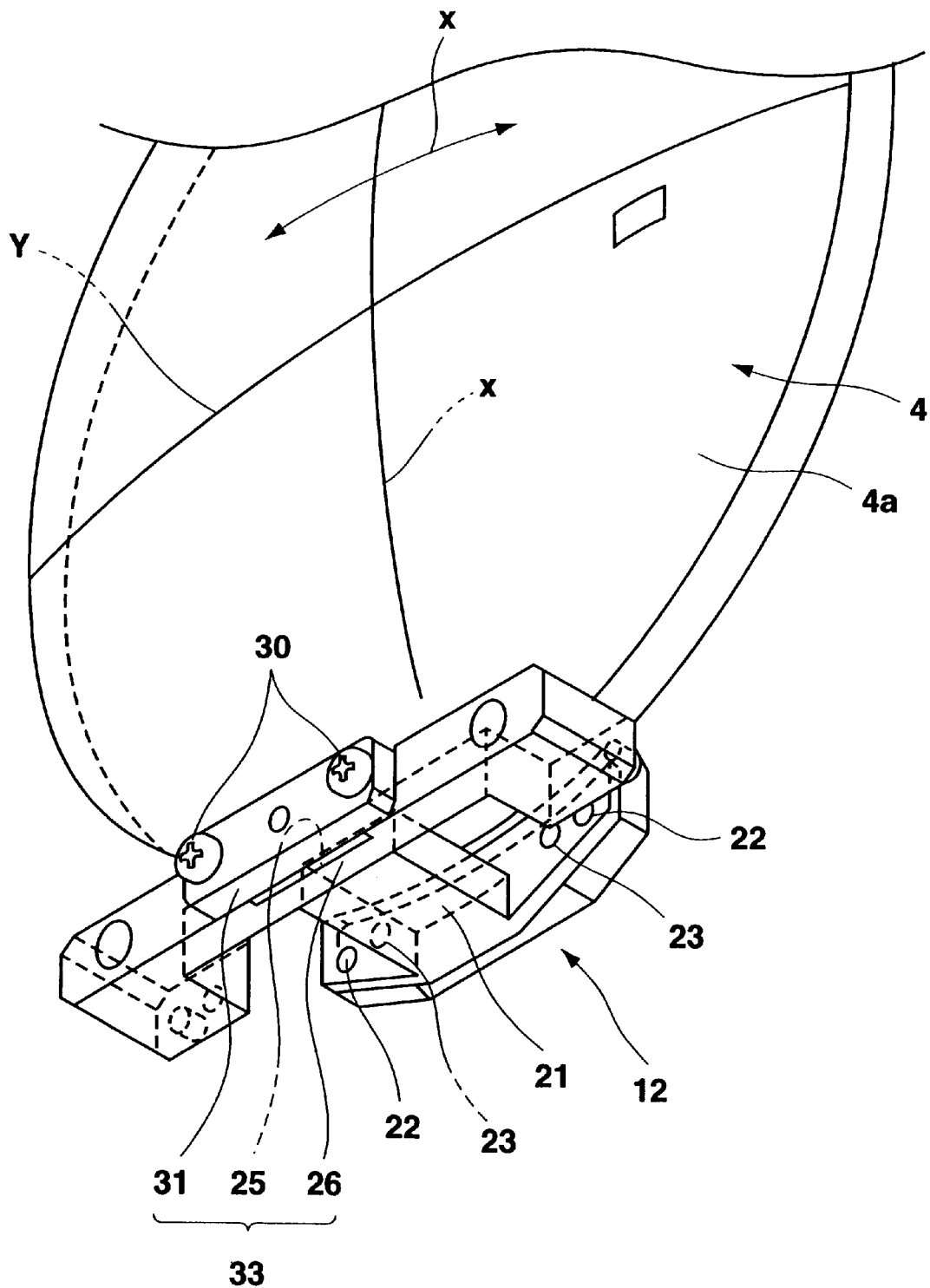
FIG. 7 is a perspective view showing a rotational fulcrum portion of the lens swing mechanism.
Figure 8:
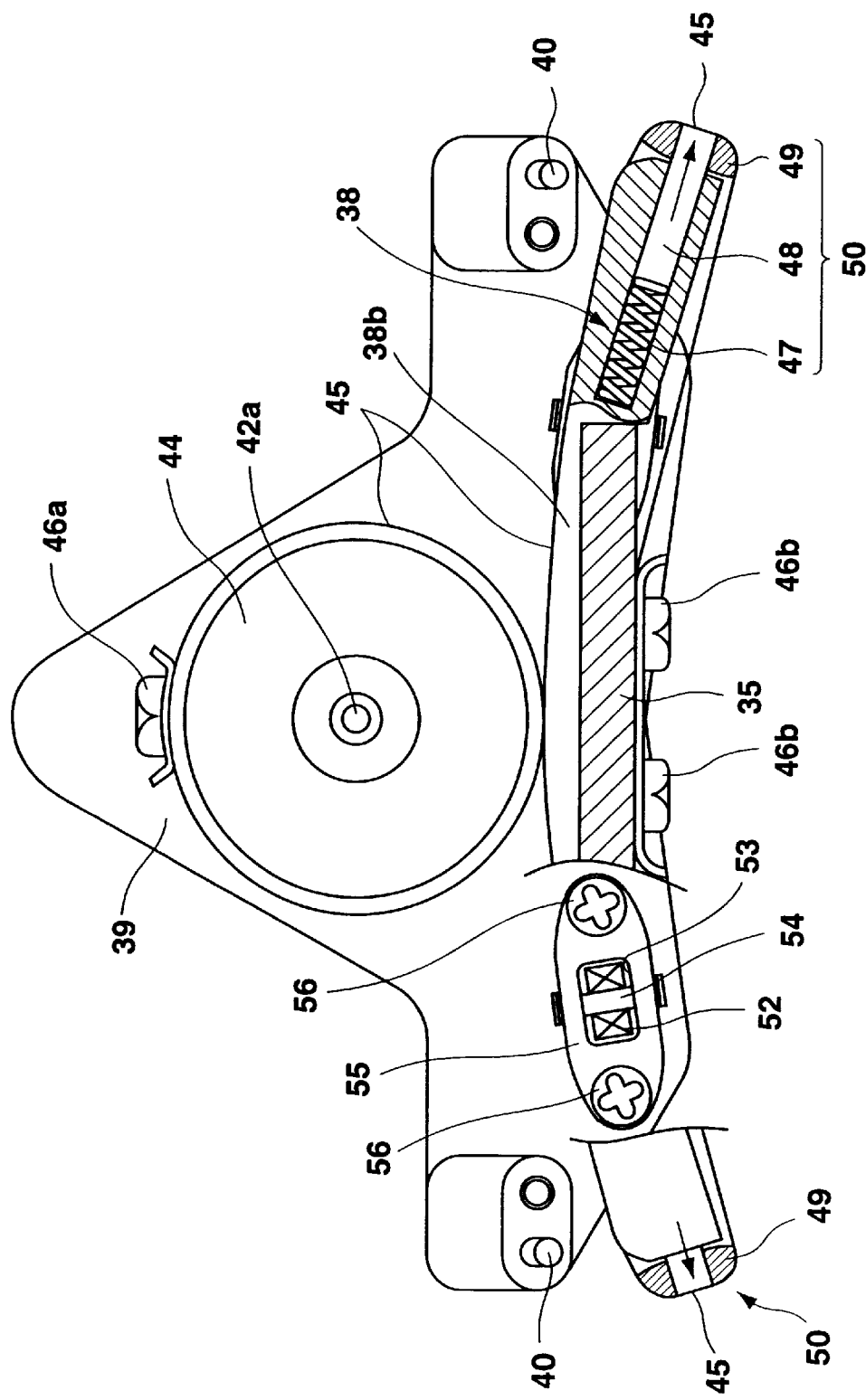
FIG. 8 is a partially notched side view showing a rotational driving portion of the lens swing mechanism.
Figure 12:
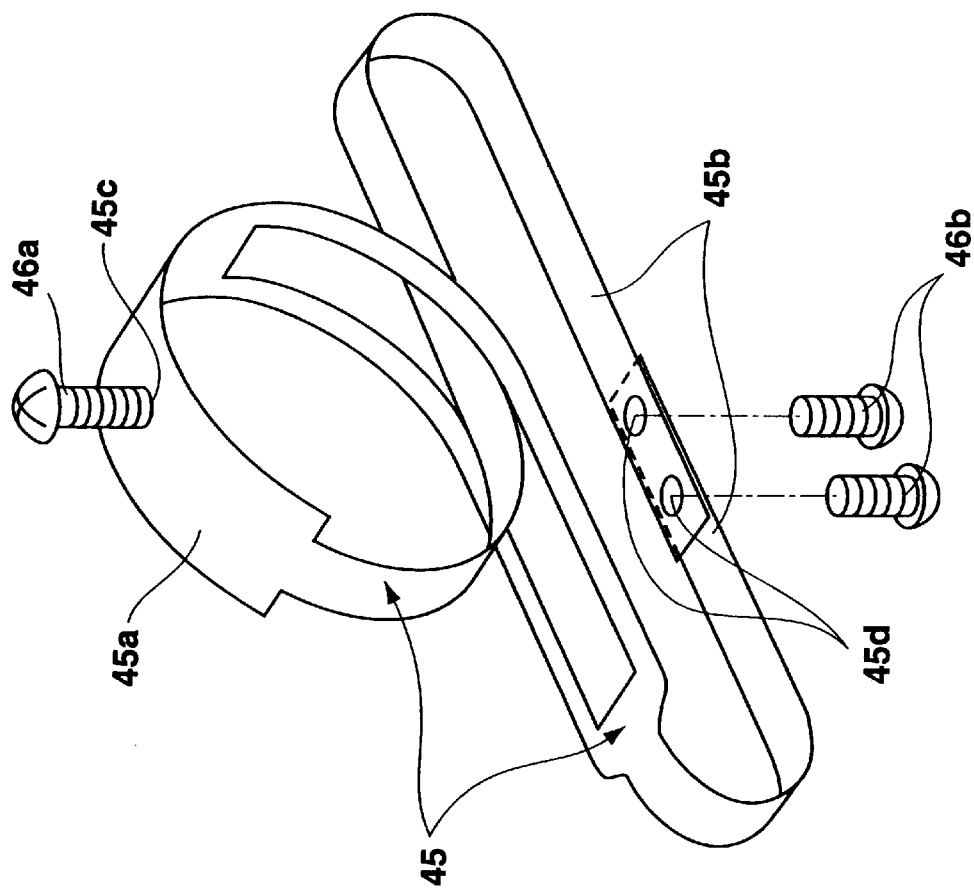
FIG. 12 is a perspective view showing the alpha-winding of the steel belt.
Figure 13:
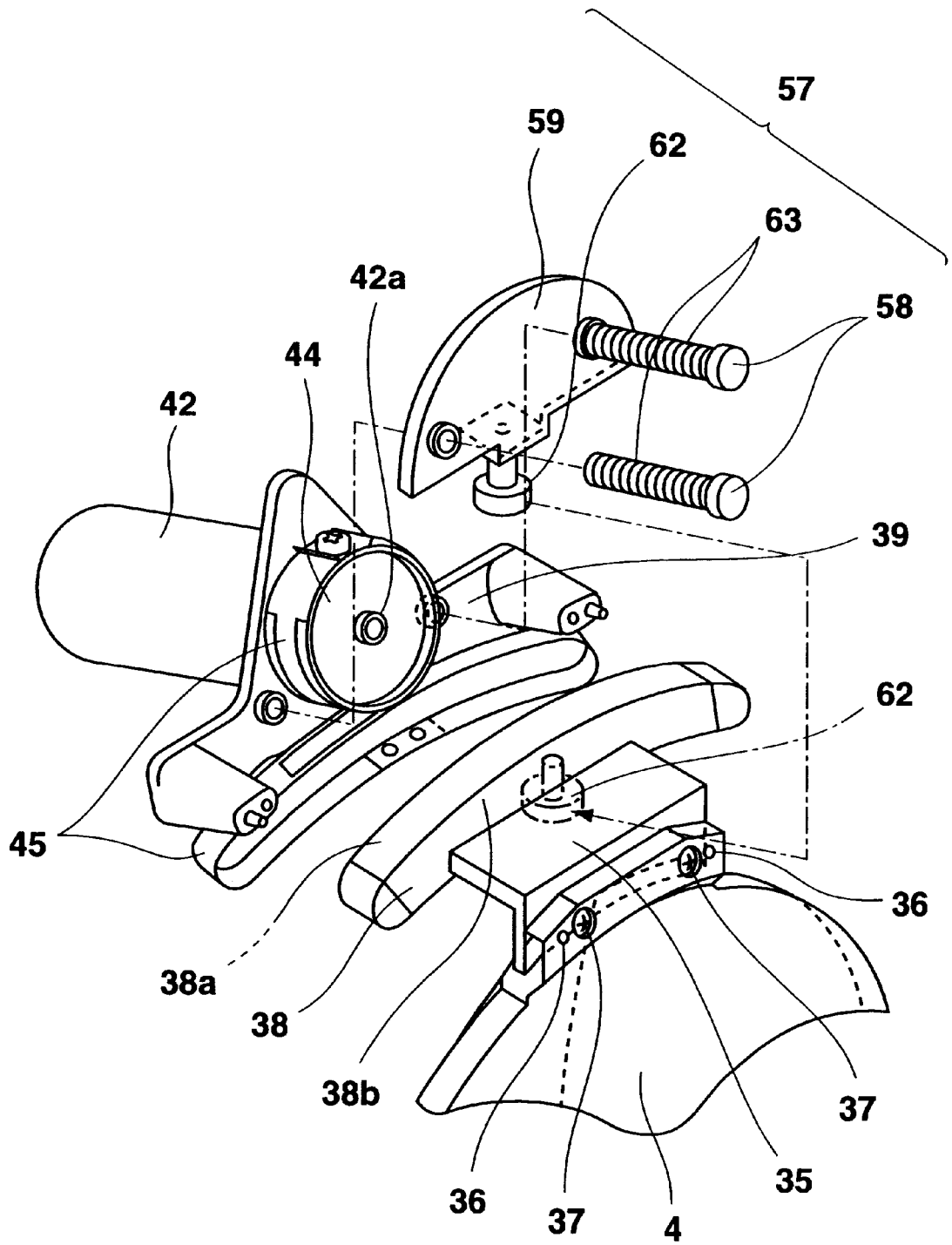
FIG. 13 is an exploded perspective view showing the rotational driving portion and the rotational guide.

Next, the rotational driving portion 13 and the rotational guide 14 of the planoconvex lens 4 will be described with reference to FIGS. 3, 5, 6, 8 to 14. With respect to the rotational driving portion 13, a lens support member 35 is fixed to the other end 4d of the planoconvex lens 4 by a pair of positioning pin 36 and screw 37, and a guide member 38 which is designed in an arcuate form with the pivot bearing 33 at the center is integrally formed at the tip of the lens support member 35. At the outside of the notch 20 of the flange portion 16 b in the lens holder 16, a substantially U-shaped motor fixing table 39 which is disposed so as to extend over the notch 20 is fixed by a pair of positioning pin 40 and screw 41. A compact DC motor 42 serving as a compact actuator is vertically fixed to the outside of the center portion of the motor fixing table 39 by a pair of screws 43, and a pulley 44 which is fixed to the outer periphery of the tip of the motor shaft 42a is inserted into the notch 20 from the outside. The lens support member 35 and the guide member 38 are inserted into the notch 20 from the inside, and a steel belt 45 which is a belt is alpha-wounded between the outer peripheries of the pulley 44 and the guide member 38. That is, as shown in FIG. 12, the center portion 45a in the length direction of the steel belt 45 is circularly wounded around the outer periphery of the pulley 44 in a circular form by 360°, and then both end portions 45b thereof are arcuately wounded around the outer periphery of the guide member 38 by 360°. The center portion 45a and the both end portions 4b are fixed to the outer peripheries of the pulley 42 and the guide member 38 respectively by screws 46a, 46b which are inserted through screw insertion holes 45c, 45d formed at the center portion 45a and the both end portions 45b of the steel belt. As shown in FIG. 6, at both the ends in the length direction of the guide member 38 are installed a belt tensioner 50 having a tension member 49 which is tensioned by pressing the steel belt 45 from the inside to both the sides through a pin 48 with a compression coil spring 47.

With respect to the rotational guide 14, the guide member 38 and the motor fixing table 39 are constructed in parallel to the rotational reference plane Z shown in FIG. 3, and a pair of bearings 52 serving as guide rollers are secured at two places along the arrow x direction at both sides of the motor shaft 42a of the motor fixing table 39. At this time, respective bearings 52 are rotatably secured through a support shaft 54 in a pair of recess portions 53 which are formed in the motor fixing table 39, and bearing covers 55 are fixed to the outside of the recess portions 52 by a pair of screws 56. The side surface 38a at the motor fixing table 39 side of the guide member 38 is brought into contact with both the bearings 52. A press portion 57 for pressing the side surface 38a thereof against both the bearings 52 is constructed by a pair of guide pins 58 which are secured in parallel at the opposite side to the motor 42 side of the motor fixing table 39, a roller support plate 59 which is slidably secured along these guide pins 58, a guide roller 62 which is rotatably secured to the center portion of the roller support plate 59 through a support shaft 60 and a bearing 61, and a pair of compression coil springs 63 which are inserted into the outer peripheries of the pair of guide pins 58 to press the roller support plate 59 to the motor fixing table 39 side in parallel and press the guide roller 62 to the side surface 38b at the opposite side to the motor fixing table 39 of the guide member 38.

Figure 9:
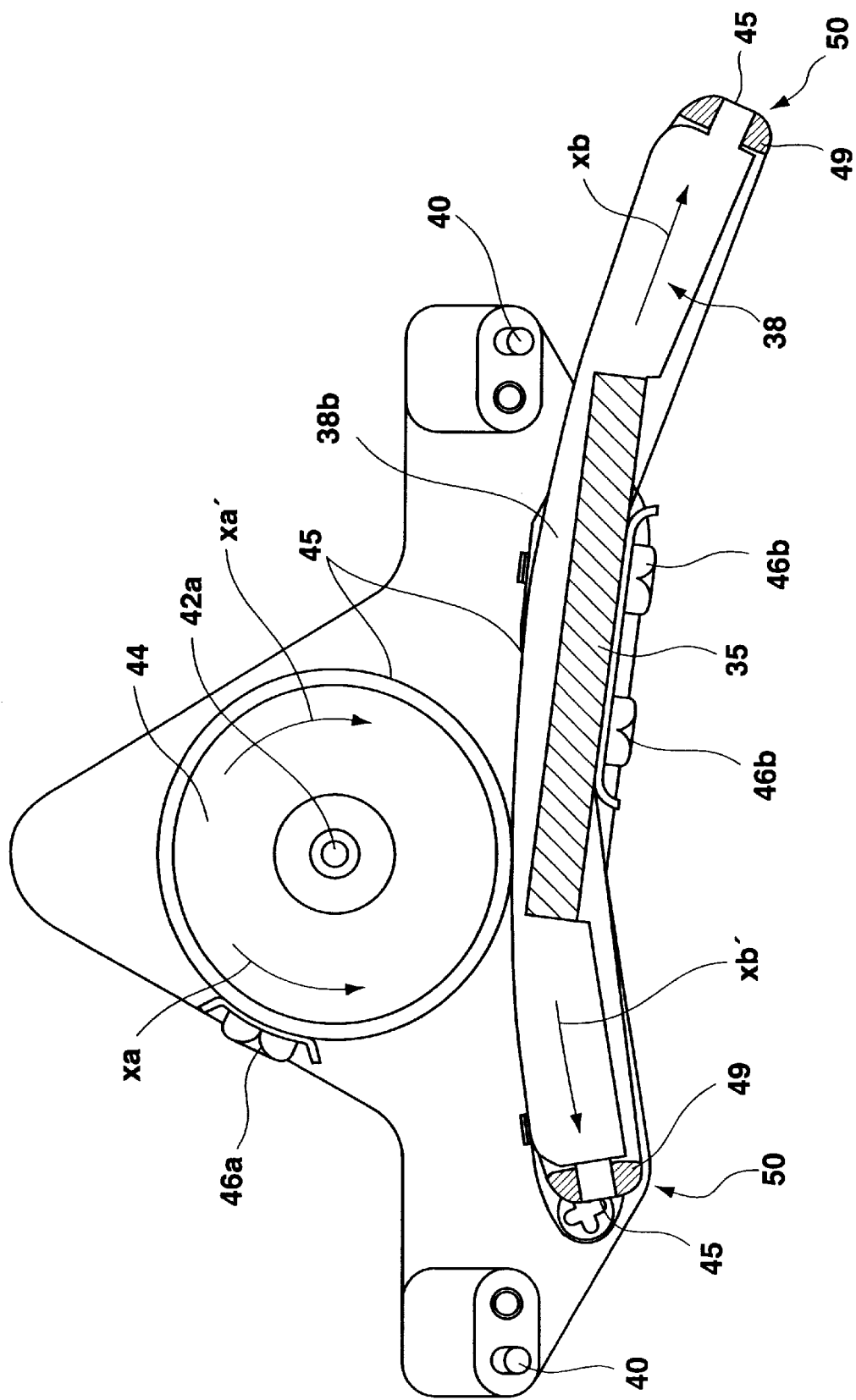
FIG. 9 is a partially notched side view showing the rotational driving operation in the rotational driving portion of FIG. 8.
Figure 10:
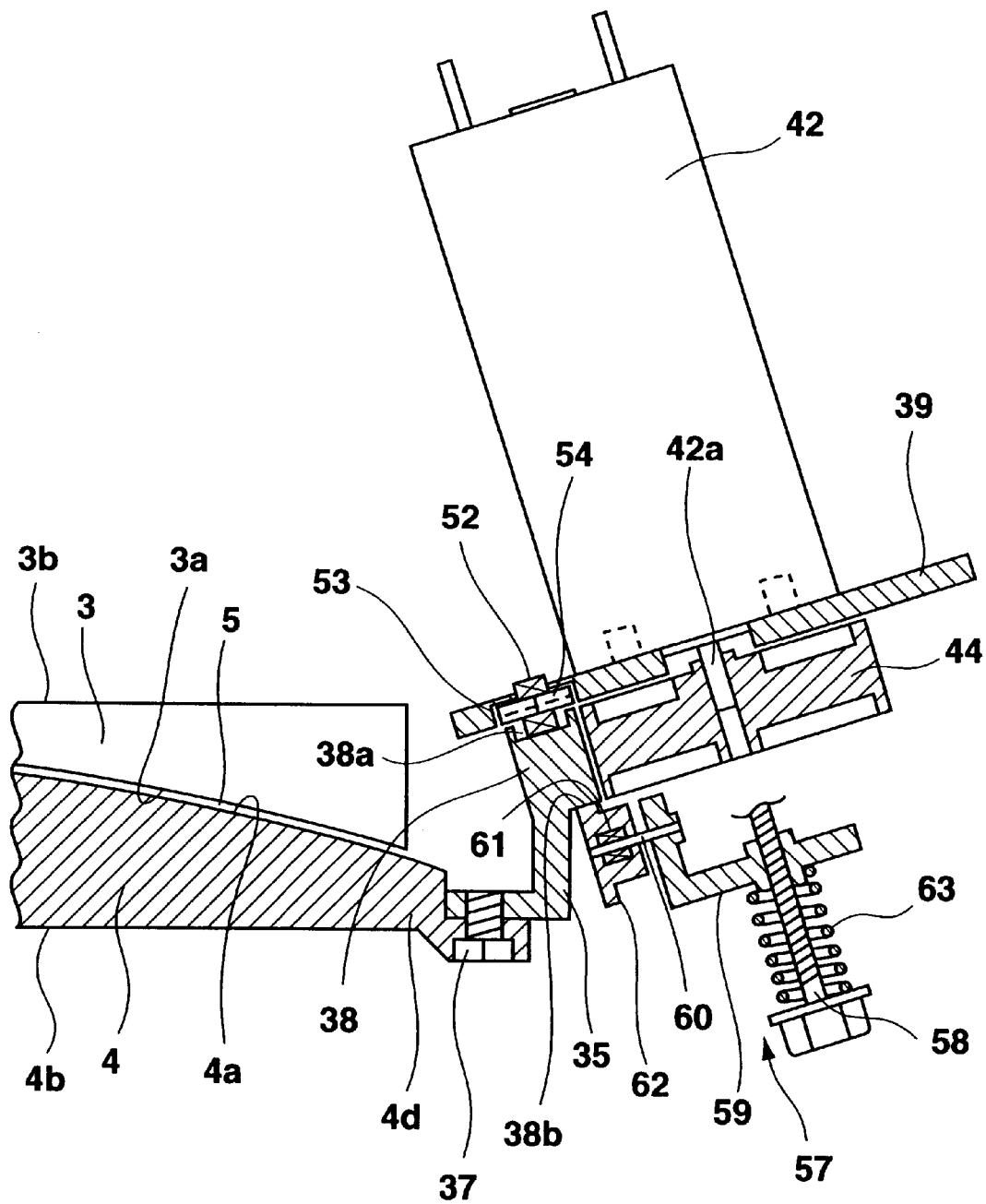
FIG. 10 is a partially notched side view showing the rotational driving portion and a rotational guide of the lens swing mechanism.
Figure 11:
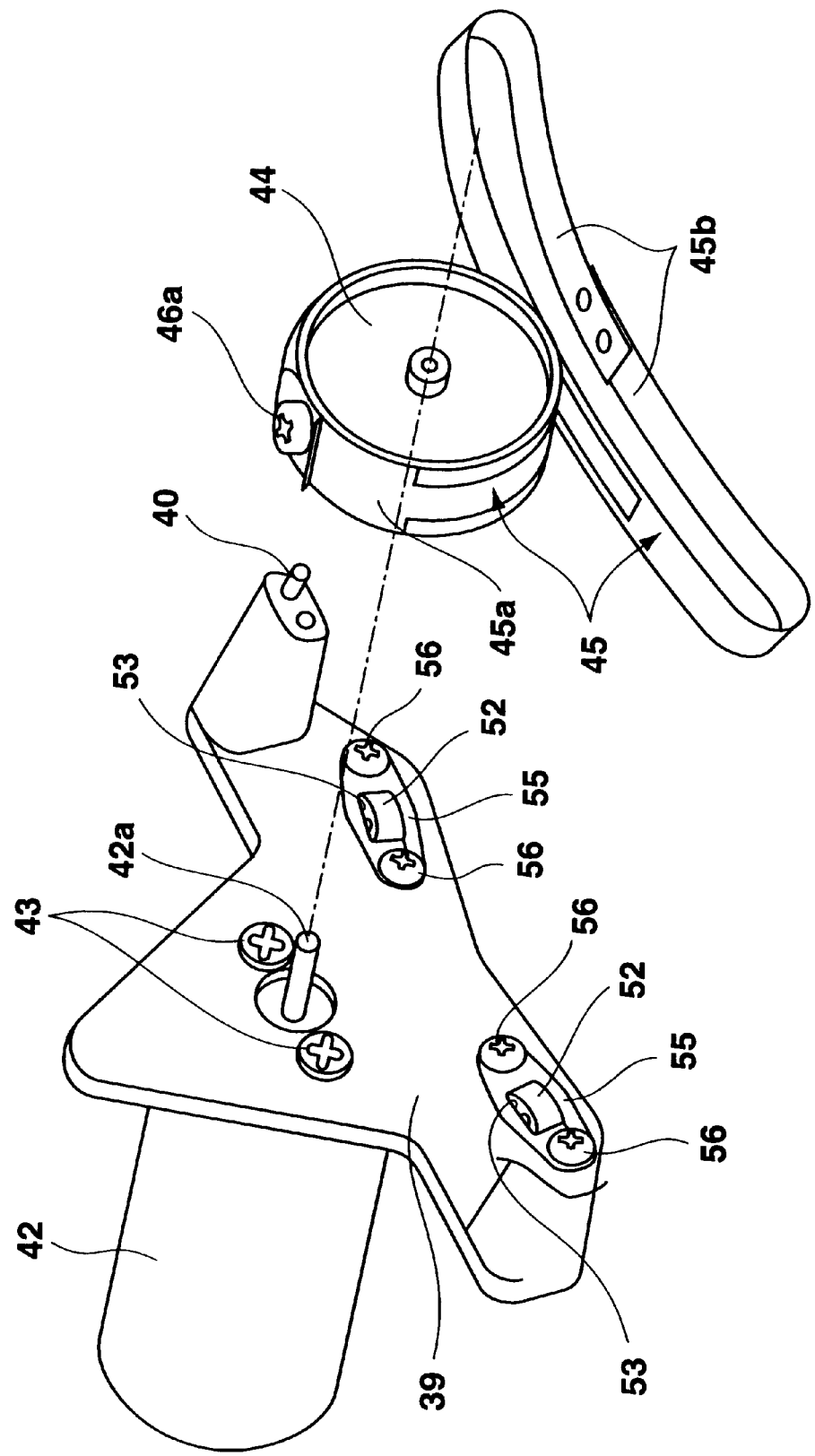
FIG. 11 is an exploded perspective view showing a motor, a pulley and steel belt in the rotational driving portion.

The lens swing mechanism of the planoconvex lens 11 is constructed as described above. When the pulley 44 is forwardly rotated in the direction of an arrow $x_a$ by the motor 42 as shown in FIGS. 6 and 9, the guide member 38 is forwardly rotated with no loss and no backlash in the direction of an arrow $x_b$ integrally with the lens support member 35 through the alpha-wounded steel belt 45. Further, conversely, when the pulley 44 is reversely rotated in the direction of an arrow $x_a'$ by the motor 42, the guide member 38 is likewise reversely rotated in the direction of an arrow $x_b'$ integrally with the lens support member 35 through the steel belt 45. At this time, since the guide roller 62 presses the other side surface 38b of the guide member 38 at all times by the pair of compression coil springs 63 of the press portion 57, one side surface 38a of the guide member 38 is pressed against the pair of bearings 52 at all times, and the guide member 38 is smoothly rotated in the direction of the arrows $x_b$ and $x_b'$ with no loss and no backlash while guided integrally with the lens support member 35 by the pair of bearings 52.

When the other end 4d of the planoconvex lens 4 is smoothly rotated in the direction of the arrow $x_b$ and the direction of the arrow $x_b'$ with no loss and no backlash by the lens support member 35, the planoconvex lens 4 is smoothly rotated in the directions of the arrows $x_b$ and $x_b'$ along the rotational reference plane Z around the rotational center line $X_2$ with the pivot bearing 33 on the rotational center line $X_2$ shown in FIG. 3 at the rotational center. Accordingly, as described with reference to FIG. 1B, the planoconvex lens 4 is relatively rotated in the direction of the arrow x along the spherical surface 3a of the planoconcave lens 3 while accurately keeping a slight gap 5 between the spherical surfaces 3a and 4a of the planoconcave lens 3 and the planoconvex lens 4 to vary the apex angle α between the flat surfaces 3b and 4b of the planoconcave lens 3 and the planoconvex lens 4, whereby the optical correction of the optical axis F due to the shaking motion of the video camera 7 as described with reference to FIGS. 2A and 2B can be performed with high precision.

According to the lens swing mechanism 11 of the present invention, as shown in FIGS. 3 and 4, it is sufficient that the pivot bearing 33 is mounted to the lens holder 16 serving as a chassis at one point on the rotational center lines $X_2$ and $Y_2$, and it is unnecessary that the support shaft, etc. are extended from the center $O_2$ of the ball having a large diameter, the spherical surfaces 3a and 4a of the planoconcave lens 3 and the planoconvex lens 4 corresponding to a part of the spherical surface of the ball, in order to support the planoconcave lens 3 and the planoconvex lens 4 freely rotatably. Accordingly, the spatial saving of the lens swing mechanism promotes great reduction in size and weight of the picture blurring correction apparatus 6.

The embodiment of the present invention is described above. However, the present invention is not limited to the above embodiment, and various modifications may be made on the basis of the technical idea of the present invention. For example, the lens swing mechanism 11 described in this embodiment is not limited to the lens driving of the apex-angle variable prism 2, and for example, it is applicable to a mechanism for panning an overall video camera or other types of rotational motion mechanisms. Further, various structures may be adopted for the rotational fulcrum portion 12, the rotational driving portion 13 and the rotational guide 14 in the lens swing mechanism 11.

The apex-angle variable prism and the video camera thus constructed have the following effects.

When at least one of the planoconcave lens and the planoconvex lens whose spherical surfaces are confronted to each other is rotated along these spherical surfaces relatively to the other lens, with the rotational fulcrum portion of the one end of the one lens at the center, the other end thereof is rotated by the rotational driving portion, whereby the one lens is rotated stably with no backlash. Therefore, unlike the conventional gyroscope structure, the one lens can be rotated within a saved space, and the compact and light design of the apex-angle variable prism can be achieved. Further, both of the one end and the other end of the one lens can be supported, so that the one lens can be rotated with high precision without occurrence of lens falling or the like and thus the picture blurring correction, etc. of the video camera can be performed with high precision.

When at least one of the planoconcave lens and the planoconvex lens whose spherical surfaces are confronted to each other is rotated along these spherical surfaces relatively to the other lens, the one lens is rotated around the rotational center line which is inclined to the normal of the flat surface of the one lens by a predetermined angle. Therefore, the one lens can be simply rotated along the spherical surface of the other lens.

When at least one of the planoconcave lens and the planoconvex lens whose spherical surfaces are confronted to each other is rotated along these spherical surfaces relatively to the other lens, the one lens is rotated around the rotational center line which is inclined to the normal of the flat surface of the one lens by a predetermined angle and passes through the center of the radius of curvature of the spherical surface of the one lens. Therefore, the one lens can be accurately rotated along the spherical surface of the other lens while a gap between the spherical surfaces of the planoconcave lens and the planoconvex lens.

The rotational fulcrum portion of the one lens is constructed by a pivot bearing. Therefore, the pivot bearing can be simply disposed at one point on the rotational center line which is inclined to the normal of the flat surface of the one lens by a predetermined angle and passes through the center of the radius of curvature of the spherical surface of the one lens, so that the structure and the manufacturing process are simple.

There is provided guide means for guiding the one lens along the rotational reference plane which is perpendicular to the rotational center line of the one lens. Therefore, as compared with a prism in which one lens is guided by the spherical surface or cylindrical surface of the lens, the rotational resistance of the one lens is smaller, and the one lens can be smoothly rotated by using a compact actuator. Therefore, the space saving and the power saving, and the enhancement of the apex-angle varying speed can be performed. Therefore, the response of the picture blurring correction when the picture blurring apparatus for a video camera is used is dramatically enhanced.

The one lens is rotated by the belt which is alpha-wound around the outer periphery of the pulley rotated by the motor. Therefore, the lens can be rotated with a simple structure and with no loss and no backlash, so that the apex angle can be varied with high precision.

The gap is formed between the spherical surfaces of the planoconcave lens and the planoconvex lens, Therefore, the spherical surfaces of the planoconcave lens and the planoconvex lens can be beforehand prevented from sliding on each other and being damaged when the apex angle is varied.

An apex-angle variable prism which is compact and light and has high response is secured to the tip of the lens barrel. Therefore, the video camera can be prevented from being larger in size and heavier in weight due to installation of the apex-angle variable prism, and thus the operability in the video pickup operation can be dramatically enhanced.

What is claimed is:

1. An apex-angle variable prism comprising:

a plano-concave lens and a plano-convex lens, each having opposed flat and spherical surfaces and whose spherical surfaces are confronted to each other and have identical radius of curvatures; and means for rotating along a rotational center line at least one of said plano-concave lens and said plano-convex lens relative to the other lens along the spherical surfaces to vary the apex angle which is formed by said plano-concave lens and said plano-convex lens, wherein said apex angle varying means include a rotational fulcrum position which is disposed at one end side of said one lens, and a rotational driving portion which is disposed at the other end side of said one lens, and wherein said one end side and the other end side of said one lens are supported respectively by said rotational fulcrum portion and said rotational driving portion, said rotatable fulcrum portion being in the form of a pivot bearing which is disposed at a point on the rotational center line which is inclined to the normal direction of the flat surface of said one lens by a predetermined angle and passes through the radius of curvature of the spherical surface of said one lens.

2. The apex-angle variable prism as claimed in claim 1, wherein said rotational driving portion includes a pulley which is rotationally driven by a motor, and a belt which is alpha-wound around the outer periphery of said pulley to rotationally drive said one lens.

3. An apex-angle variable prism as claimed in claim 1, wherein a gap is formed between said planoconcave lens and said planoconvex lens.

4. An apex-angle variable prism comprising:

a plano-concave lens and a plano-convex lens, each having opposed flat and spherical surfaces and whose spherical surfaces are confronted to each other and have identical radius of curvatures; and means for rotating along a rotational center line at least one of said plano-concave lens and said plano-convex lens relative to the other lens along the spherical surfaces to vary the apex angle which is formed by said plano-concave lens and said plano-convex lens, wherein said apex angle varying means rotationally drives said one lens around a rotational center line which is slanted at a predetermined angle to the normal axis of the flat surface of said one lens, wherein said apex angle varying means includes a rotational fulcrum portion which is disposed at one end side of said one lens, and a rotational driving portion which is disposed at the other end side of said one lens, and wherein said one end side and the other end side of said one lens are supported respectively by said rotational fulcrum portion and said rotational driving portion, said rotatable fulcrum portion being in the form of a pivot bearing which is disposed at a point on the rotational center line which is inclined to the normal direction of the flat surface of said one lens by a predetermined angle and passes through the radius of curvature of the spherical surface of said one lens.

5. An apex-angle variable prism as claimed in claim 4, wherein a gap is formed between said planoconcave lens and said planoconvex lens.

6. An apex-angle variable prism comprising:

a plano-concave lens and a plano-convex lens, each having opposed flat and spherical surfaces and whose spherical surfaces are confronted to each other and have identical radius of curvatures; and means for rotating along a rotational center line at least one of said plano-concave lens and said plano-convex lens relative to the other lens along the spherical surfaces to vary the apex angle which is formed by said plano-concave lens and said plano-convex lens, wherein said apex angle varying means rotationally drives said one lens around a rotational center line which is slanted at a predetermined angle to the normal axis of the flat surface of said one lens and passes through the center of the radius of curvature of the spherical surface of said one lens, and wherein said apex angle varying means includes a rotational fulcrum portion which is disposed at one end side of said one lens, and a rotational driving portion which is disposed at the other end side of said one lens, and wherein said one end side and the other end side of said one lens are supported respectively by said rotational fulcrum portion and said rotational driving portion, said rotatable fulcrum portion being in the form of a pivot bearing which is disposed at a point on the rotational center line which is inclined to the normal direction of the flat surface of said one lens by a predetermined angle and passes through the radius of curvature of the spherical right surface of said one lens.

7. The apex-angle variable prism as claimed in claim 6, further including means for guiding said one lens along a rotational reference plane which is perpendicular to the rotational center line of said one lens.

8. An apex-angle variable prism as claimed in claim 6, wherein a gap is formed between said planoconcave lens and said planoconvex lens.

9. A video camera having a lens barrel and an apex-angle variable prism secured to the tip of said lens barrel, said apex-angle variable prism comprising:

a plano-concave lens and a plano-convex lens, each having opposed flat and spherical surfaces and whose spherical surfaces are confronted to each other and have identical radius of curvatures; and means for rotating along a rotational center line at least one of said plano-concave lens and said plano-convex lens relative to the other lens along the spherical surfaces to vary the apex angle which is formed by said plano-concave lens and said plano-convex lens, wherein said apex angle varying means includes a rotational fulcrum portion which is disposed at one end side of said one lens and a rotational driving portion which is disposed at the other end side of said one lens, and wherein said one end side and the other end side of said one lens are supported respectively by said rotational fulcrum portion and said rotational driving portion, said rotational fulcrum portion being in the form of a pivot bearing which is disposed at a point on the rotational center line which is inclined to the normal direction of the flat surface of said one lens by a predetermined angle and passes through the radius of curvature of the spherical surface of said one lens.

10. A video camera having a lens barrel and an apex-angle variable prism secured to the tip of said lens barrel, said apex-angle variable prism comprising:

a plano-concave lens and a plano-convex lens, each having opposed flat and spherical surfaces and whose spherical surfaces are confronted to each other and have identical radius of curvatures; and means for rotating along a rotational center line at least one of said plano-concave lens and said plano-convex lens relative to the other lens along the spherical surfaces to vary the apex angle which is formed by said plano-concave lens and said plano-convex lens, wherein said apex angle varying means rotationally drives said one lens around a rotational center line which is slanted at a predetermined angle to the normal axis of the flat surface of said one lens, wherein said apex angle varying means includes a rotational fulcrum portion which is disposed at one end side of said one lens, and a rotational driving portion which is disposed at the other end side of said one lens, and wherein said one end side and the other end side of said one lens are supported respectively by said rotational fulcrum portion and said rotational driving portion, said rotational fulcrum portion being in the form of a pivot bearing which is disposed at a point on the rotational center line which is inclined to the normal direction of the flat surface of said one lens by a predetermined angle and passes through the radius of curvature of the spherical surface of the one lens.

11. A video camera having a lens barrel and an apex-angle variable prism secured to the tip of said lens barrel, said apex angle variable prism comprising:

a plano-concave lens and a plano-convex lens, each having opposed flat and spherical surfaces and whose spherical surfaces are confronted to each other and have identical radius of curvatures; and means for rotating along a rotational center line at least one of said plano-concave lens and said plano-convex lens relative to the other lens along the spherical surfaces to vary the apex angle which is formed by said plano-concave lens and said plano-convex lens, wherein said apex angle varying means rotationally drives said one lens around a rotational center line which is slanted at a predetermined angle to the normal axis of the flat surface of said one lens and passes through the center of the radius of curvature of the spherical surface of said one lens, wherein said apex angle varying means includes a rotational fulcrum portion which is disposed at one end side of said one lens, and a rotational driving portion which is disposed at the other end side of said one lens, and wherein said one end side and the other end side of said one lens are supported respectively by said rotational fulcrum portion and said rotational driving portion, said rotational fulcrum portion being in the form of a pivot bearing which is disposed at a point on the rotational center line which is inclined to the normal direction of the flat surface of said one lens by a predetermined angle and passes through the radius of curvature of the spherical surface of said one lens.

\* \* \* \* \*